(12) United States Patent
Printz et al.

(10) Patent No.: US 10,007,598 B2
(45) Date of Patent: Jun. 26, 2018

(54) DATA-DRIVEN TESTING FRAMEWORK

(71) Applicant: Ab Initio Technology LLC, Lexington, MA (US)

(72) Inventors: Philippe Printz, Billerica, MA (US); Marshall Alan Isman, Newton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days. days.

(21) Appl. No.: 14/845,772

(22) Filed: Sep. 4, 2015

(65) Prior Publication Data

US 2016/0070641 A1    Mar. 10, 2016

Related U.S. Application Data

(60) Provisional application No. 62/047,256, filed on Sep. 8, 2014.

(51) Int. Cl.
*G06F 11/36* (2006.01)
*G06F 11/34* (2006.01)

(52) U.S. Cl.
CPC ...... *G06F 11/3692* (2013.01); *G06F 11/3684* (2013.01); *G06F 11/3466* (2013.01); *G06F 11/3636* (2013.01); *G06F 11/3676* (2013.01)

(58) Field of Classification Search
CPC ........................................ G06F 11/36–11/3696
USPC .................................. 717/124–128, 130–135
See application file for complete search history.

(56) References Cited

U.S. PATENT DOCUMENTS

| | | | | |
|---|---|---|---|---|
| 7,065,677 B1 * | 6/2006 | Hughes | ............... | G06F 11/3676 714/37 |
| 7,117,219 B1 * | 10/2006 | Powers | ............. | G06F 17/30572 707/603 |
| 7,366,740 B2 * | 4/2008 | Sleeman | ........... | G06F 17/30306 707/691 |

(Continued)

FOREIGN PATENT DOCUMENTS

EP    2541443    1/2013

OTHER PUBLICATIONS

Lin, Z., et al., Convicting exploitable software vulnerabilities: An efficient input provenance based approach, IEEE International Conference on Dependable Systems and Networks With FTCS and DCC, 2008, 10 pages, [retrieved on Apr. 11, 2017], Retrieved from the Internet: <URL:http://ieeexplore.ieee.org/>.*

(Continued)

*Primary Examiner* — Geoffrey St. Leger
(74) *Attorney, Agent, or Firm* — Occhiuti & Rohlicek LLP

(57) ABSTRACT

An apparatus for testing applications includes a data-processing machine including a memory and a processor operably coupled to the memory. The data-processing machine is configured to implement a data-driven testing framework that includes a data engineering module, a computational environment manager, and a result analysis module. The data engineering module is configured to create engineered test data based at least in part on the application to be tested. The computational environment manager is configured to control a computational environment in which the application is to operate on the engineered test data. The result analysis module is configured to compare engineered test data operated upon by the application with an expected output.

50 Claims, 15 Drawing Sheets

(56) References Cited

U.S. PATENT DOCUMENTS

| | | | |
|---|---|---|---|
| 8,510,715 B1 | 8/2013 | Ormandy et al. | |
| 8,682,910 B2* | 3/2014 | Fu | G06F 17/3053 707/688 |
| 8,745,592 B1 | 6/2014 | Ormandy et al. | |
| 8,924,402 B2* | 12/2014 | Fuh | G06F 11/3672 707/757 |
| 8,996,915 B2* | 3/2015 | Clifford | G06F 11/3684 714/25 |
| 9,218,269 B2* | 12/2015 | Dolinina | G06F 11/3672 |
| 9,449,057 B2* | 9/2016 | Anderson | G06F 17/30321 |
| 9,495,280 B2* | 11/2016 | Yasuda | G06F 11/3668 |
| 2006/0069961 A1 | 3/2006 | Kalyanaraman | |
| 2007/0165911 A1* | 7/2007 | Baentsch | G06F 21/32 382/115 |
| 2008/0256517 A1 | 10/2008 | Atkin et al. | |
| 2009/0192963 A1* | 7/2009 | Sankaranarayanan | G06N 5/04 706/46 |
| 2010/0205153 A1* | 8/2010 | Lamm | G06F 17/30575 707/655 |
| 2010/0306854 A1 | 12/2010 | Neergaard | |
| 2010/0318481 A1 | 12/2010 | Feynman | |
| 2010/0325359 A1* | 12/2010 | Goel | G06F 9/30018 711/125 |
| 2011/0313979 A1 | 12/2011 | Roberts | |
| 2012/0036135 A1* | 2/2012 | Fu | G06F 17/3053 707/748 |
| 2012/0197887 A1* | 8/2012 | Anderson | G06F 17/30321 707/736 |
| 2013/0124576 A1* | 5/2013 | Adir | G06F 11/3684 707/803 |
| 2013/0139003 A1* | 5/2013 | Patwardhan | G06F 11/3684 714/32 |
| 2013/0159353 A1* | 6/2013 | Fuh | G06F 11/3672 707/803 |
| 2013/0159774 A1 | 6/2013 | Budnik et al. | |
| 2013/0166886 A1* | 6/2013 | Sasanka | G06F 9/30098 712/216 |
| 2013/0311830 A1* | 11/2013 | Wei | G06F 11/3684 714/32 |
| 2013/0332423 A1* | 12/2013 | Puri | G06F 17/30309 707/687 |
| 2014/0006459 A1* | 1/2014 | Guo | G06F 17/30292 707/805 |
| 2014/0006866 A1* | 1/2014 | Clifford | G06F 11/3684 714/32 |
| 2014/0075242 A1* | 3/2014 | Dolinina | G06F 11/3672 714/27 |
| 2014/0222752 A1* | 8/2014 | Isman | G06F 11/3684 707/603 |
| 2014/0279934 A1* | 9/2014 | Li | G06F 17/30563 707/687 |
| 2014/0282848 A1* | 9/2014 | Patwardhan | G06F 11/3684 726/1 |
| 2014/0317601 A1* | 10/2014 | Patwardhan | G06F 11/3684 717/124 |
| 2015/0169428 A1 | 6/2015 | Isman et al. | |
| 2015/0186227 A1* | 7/2015 | Kolassery | G06F 11/167 714/763 |
| 2015/0213366 A1 | 7/2015 | Gould | |
| 2016/0062877 A1* | 3/2016 | Tripp | G06F 11/3616 714/38.1 |

OTHER PUBLICATIONS

Cui, Y., et al., Lineage tracing for general data warehouse transformations, VLDB Journal, vol. 12 Issue 1, May 2003, pp. 41-58, [retrieved on Mar. 14, 2018], Retrieved from the Internet: <URL:http://dl.acm.org/>.*

Lin, Z., et al., Reverse Engineering Input Syntactic Structure from Program Execution and Its Applications, IEEE Transactions on Software Engineering, vol. 36, Issue: 5, Sep.-Oct. 2010, [retrieved on Mar. 13, 2018], Retrieved from the Internet: <URL:http://ieeexplore.ieee.org/>.*

International Search Report and Written Opinion, International Application No. PCT/US15/48528, dated Nov. 9, 2015 (12 pages).

Andreou, et al. "An automatic software test-data generation scheme based on data flow criteria and genetic algorithms." In *Computer and Information Technology, 2007. CIT 2007. 7th IEEE International Conference on*, pp. 867-872. IEEE, 2007.

Ghiduk, et al. "Using genetic algorithms to aid test-data generation for data-flow coverage." In *14th Asia-Pacific Software Engineering Conference (APSEC'07)*, pp. 4148. IEEE, 2007.

Khamis, et al., "Automatic software test data generation for spanning sets coverage using genetic algorithms." *Computing and Informatics* 26, No. 4 (2012): 383-401.

Korel, Bogdan. "Automated software test data generation." *IEEE Transactions on software engineering* 16, No. 8 (1990): 870-879.

Parashar, et al. "A project report on test case optimization: automated test data generation for data flow testing using genetic algorithm." KIET School of Engineering and Technology, Ghaziabad G.B. Technical University Lucknow. May 2013.

Suárez-Cabal,et al. "Using an SQL coverage measurement for testing database applications." In *ACM SIGSOFT Software Engineering Notes*, vol. 29, No. 6, pp. 253-262. ACM, 2004.

Swain, et al.. "Automatic test case generation from UML state chart diagram." *International Journal of Computer Applications* 42, No. 7 (2012): 26-36.

Taneja, et al. "Testing software in age of data privacy: a balancing act." In *Proceedings of the 19th ACM SIGSOFT symposium and the 13th European conference on Foundations of software engineering*, pp. 201-211. ACM, 2011.

* cited by examiner

DATA-DRIVEN TESTING FRAMEWORK

CROSS-REFERENCE TO RELATED APPLICATIONS

This application claims the benefit of the Sep. 8, 2014 priority date of U.S. Application Ser. No. 62/047,256, the contents of which are herein incorporated by reference.

BACKGROUND

This disclosure relates to quality control, and in particular, to devices and methods that are used to identify flaws or shortcomings in software applications.

A data-processing machine requires reconfiguration to transform it from a generic computer to a special purpose machine that carries out a particular task. The resulting reconfiguration thus improves the generic computer by providing it with the ability to do things that it could not do before. This reconfiguration is typically carried out by causing the generic computer to execute certain specialized software. This specialized software is often referred to as an "application" or an "app."

For large projects, the application that is to be tested is designed and implemented by a team of engineers. This application is then provided to a quality-assurance team. The quality-assurance team is typically separate from the design team. The quality-assurance team proceeds to search for defects or shortcomings in this application.

The procedure for testing an application can be very difficult. This difficulty arises for many reasons. One such reason is that the quality-assurance team is essentially trying to prove a negative, namely that no defects or shortcomings exist in the software being tested. In general, it is not cost-effective to run a large number of tests to cover every possible case. It is therefore necessary to select test data judiciously.

Another difficulty in the procedure for testing an application is that the environment in which the test is conducted can make a difference. The environment generally includes both software that is executing, and data that the application is intended to operate on. Knowing what other software is executing is important in case of interactions between the application being tested and that software. Having the correct data present is important since the features of the application that are being tested depend a great deal on the data that is provided to the application. For example, the application may request certain data from a database. In such cases, testing the application requires knowing that the database has the correct data. Accordingly, the quality-assurance team generally takes steps to control the environment.

Yet another difficulty that arises in testing an application is establishing the integrity of the results. It can, in some cases, be difficult to know what results should be considered "correct" or "incorrect" for a given input set of input data that is processed in a particular environment.

Since testing is a major part of the software development life cycle, it is useful to provide a way to more efficiently carry it out.

SUMMARY

In one aspect, the invention features an apparatus for testing applications. Such an apparatus includes a data-processing machine that has a memory and a processor operably coupled to the memory. The data-processing machine is configured to implement a data-driven testing framework that includes a data engineering module, a computational environment manager, and a result analysis module. The data engineering module is configured to create engineered test data based at least in part on the application to be tested. Meanwhile, the computational environment manager is configured to control a computational environment in which the application is to operate on the engineered test data. Finally, the result analysis module is configured to compare engineered test data operated upon by the application with an expected output.

In some embodiments, the data engineering module is configured to extract a subset of production data. This subset is selected to achieve specified code coverage. The engineered test data would then include this subset of the production data.

In other embodiments, the data engineering module includes a data still for generating distilled data from production data.

Also included within the invention's scope are embodiments in which the data engineering module is configured to extract a subset of production data, and to augment the subset with additional data, thereby generating augmented data. The additional data is selected to achieve specified code-coverage, and the engineered test data includes the augmented data.

In some embodiments, the data engineering module includes a data still and a data enhancer for receiving distilled data from the data still and enhancing the distilled data.

Additional embodiments include those in which the data engineering module is configured to generate data based at least in part on the application to be tested. The generated data is selected to achieve specified code coverage, and the engineered test data includes the generated data.

Other embodiments include those in which the data engineering module further includes a positive-data manufacturer for generating positive data, those in which the data engineering module is configured to generate data based at least in part on the application to be tested, with that data being absent from production data, and those in which the data engineering module further includes a negative-data manufacturer for generating negative data.

In some embodiments, the data engineering module includes means for generating engineered test data.

Additional embodiments include those in which the data engineering module includes an integrity checker for determining referential integrity of the engineered test data, as well as those in which the data engineering module is further configured to detect errors in referential integrity.

Also included are embodiments in which the data engineering module includes a re-referencer for correcting a loss of referential integrity in data prior to outputting the data as engineered test data, and embodiments in which the data engineering module is further configured to correct a loss of referential integrity in data.

Further embodiments include those in which the data engineering module includes an inspection unit for receiving the engineered test data and enabling a user to either view or profile the engineered test data, those in which the data engineering module includes a data-inspection unit for receiving the engineered test data and enabling a user to view the engineered test data, those in which the data engineering module includes a profiler for receiving the engineered test data and enabling a user to profile the engineered test data, those in which the data engineering module is further configured to enable a user to profile the engineered test data, and those in which the data engineering module is further configured to enable a user to view the engineered test data.

In some embodiments, the data engineering module includes several ways to generate engineered test data. In these embodiments, the choice of how to generate engineered test data depends at least in part on information concerning the application to be tested. In others, it includes a data enhancer, a data still, a negative-data manufacturer, and a positive-data manufacturer, each of which is configured to provide data that forms a basis for the engineered test data.

Also included are embodiments in which the data engineering module includes a logic extractor configured to identify those logical functions within the application that are to be tested and provides those logical functions to a data still, and embodiments in which the data engineering module is further configured to identify those logical functions within the application that are to be tested and provides those logical functions to be used as a basis for obtaining a subset of production data.

In further embodiments, the computational environment manager includes means for automatically setting up and taking down a computational environment in which testing of the application will take place.

Also among the embodiments of the invention are those in which the computational environment manager includes an environmental-transition machine. The environmental-transition machine is configured to identify a source of the engineered test data and further configured to identify a target in which to place data that results from processing of the engineered test data by the application to be tested.

In some embodiments, the environmental-transition machine is further configured to copy engineered test data from a first repository to the source. Among these are embodiments in which the environmental-transition machine is further configured to copy engineered test data from the target to a second repository.

Embodiments of the invention include those in which the computational environment manager includes an environmental-backup machine, as well as a restoration machine. In such embodiments, the environmental-backup machine is configured for backing up a first environment prior to transforming the first environment into a second environment, in which testing of the application to be tested is to take place. The restoration machine is configured for replacing the second environment with the first environment.

In some embodiments, the computational environment manager includes an executioner that is configured to cause execution of the application to be tested. Among these are embodiments in which the executioner is configured to automatically execute a script when causing execution of the application.

Yet other embodiments include an computational environment manager that has an environmental-transition machine, an environmental-backup machine, a restoration machine, and an executioner. In these embodiments, the environmental-transition machine is configured to identify a source of the engineered test data, the environmental-transition machine is further configured to identify a target in which to place data that results from processing of the engineered test data by the application to be tested, the environmental-backup machine is configured for backing up a first environment prior to transforming the first environment into a second environment, in which testing of the application to be tested is to take place. The restoration machine is configured for replacing the second environment with the first environment. And the executioner is configured to cause execution of the application to be tested.

In another aspect, the invention features a method for processing data in a computing system. Such a method includes testing applications. Testing applications in this case includes receiving information representative of an application to be tested over an input device or port of a data processing system, and processing the received information. Processing this received information includes creating engineered test data based at least in part on this information, controlling a computational environment in which the application is to operate on the engineered test data, comparing engineered test data operated upon by the application with an expected output, and outputting a result indicative of the comparison.

In another aspect, the invention features a computing system for testing applications. Such a computing system includes means for remembering information, and means for processing information. The means for processing information includes means for data-driven testing. This means for data-driven testing includes means for receiving information over either or both an input device and a port of a data processing system. This information is representative of an application that is to be tested. The means for data-driven testing further includes means for generating a collection of engineered test data based at least in part on the application that is to be tested, as well as means for managing a computational environment in which the application is to operate on the engineered test data that is generated by the means for generating a collection of engineered test data based at least in part on the application that is to be tested, and means for comparing engineered test data operated upon by the application and an expected output with each other. The computing system further includes means for outputting an analysis of the results.

In another aspect, the invention feature software stored in a non-transitory form on a computer-readable medium for managing testing of applications. Such software includes instructions for causing a computing system to execute certain processing steps. These processing steps include creating engineered test data based at least in part on an application to be tested, controlling a computational environment in which the application is to operate on the engineered test data, comparing engineered test data operated upon by the application with an expected output, and outputting an analysis of the comparison.

These and other features of the invention will be apparent from the following detailed description and the accompanying figures, in which:

BRIEF DESCRIPTION OF THE DRAWINGS

FIG. 8 shows information concerning whether the test actually ran correctly;

FIG. 11 shows an exemplary report for source-level code coverage;

DETAILED DESCRIPTION

More efficient testing can be achieved by ensuring that good data is available for testing, by providing a way to automatically run repeatable tests of the application in a known environment, by collecting results that can be used to measure correctness or otherwise evaluate the performance of the application under test, and by having a method for evaluating those results.

Figure 1:
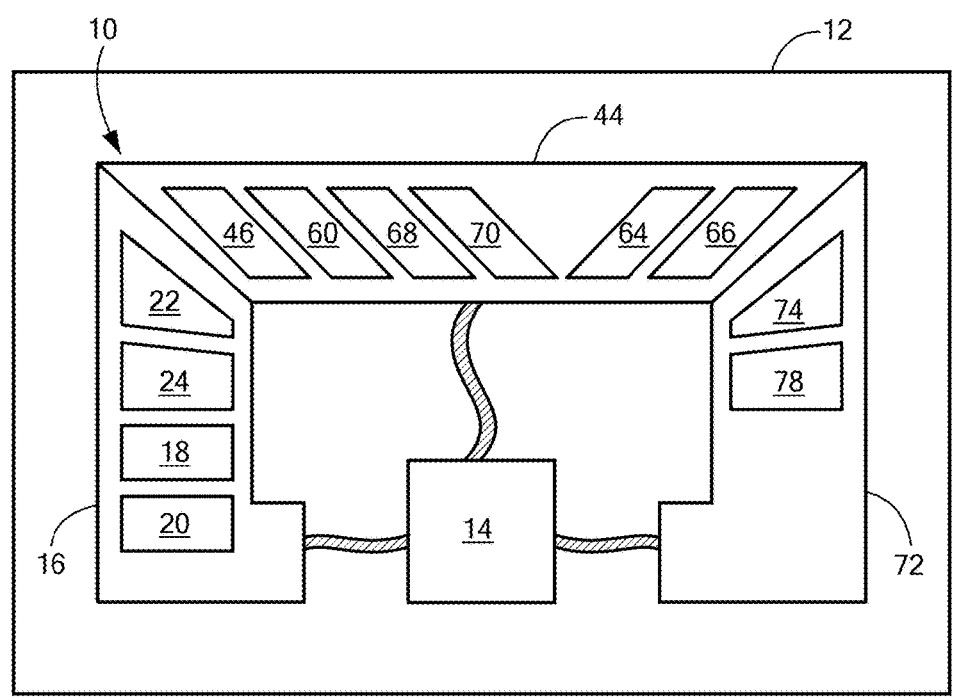
FIG. 1 is an illustration of structural relationships between components of a data-driven testing framework for an application-testing machine.

FIG. 1 shows a data-driven-testing framework 10 that is installed in a testing computer 12 to facilitate the methodical and efficient testing of an application 14 on that testing computer 12. As used herein, a "testing computer" is intended to include one or more processing systems that cooperate to carry out the application testing procedure.

Figure 2:
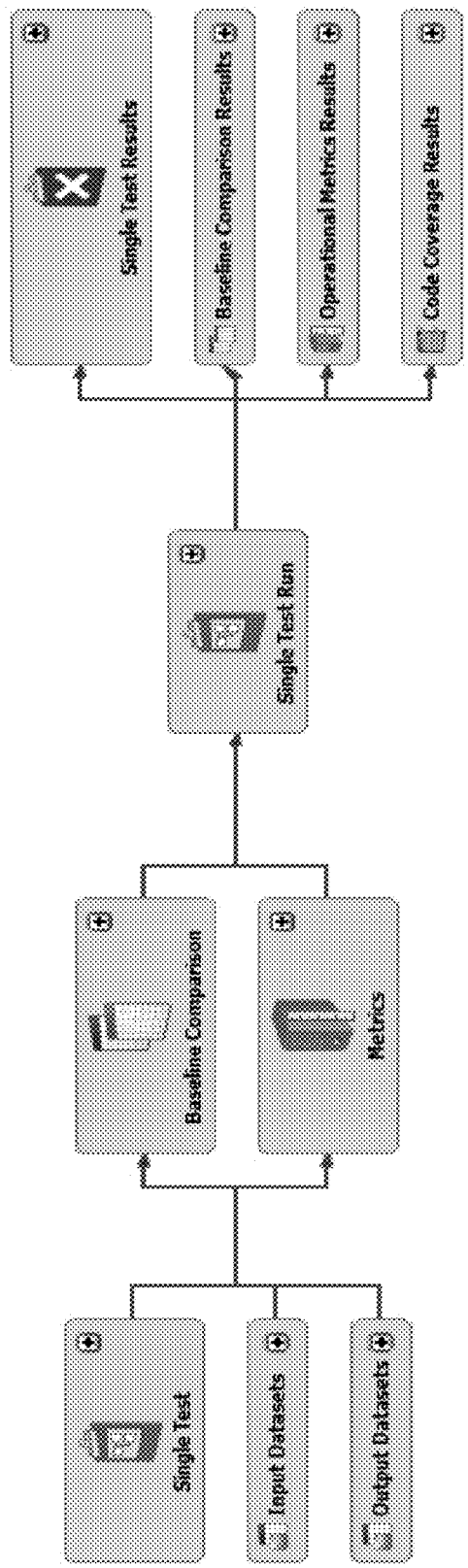
FIG. 2 shows a screen from a user interface.
Figure 3:
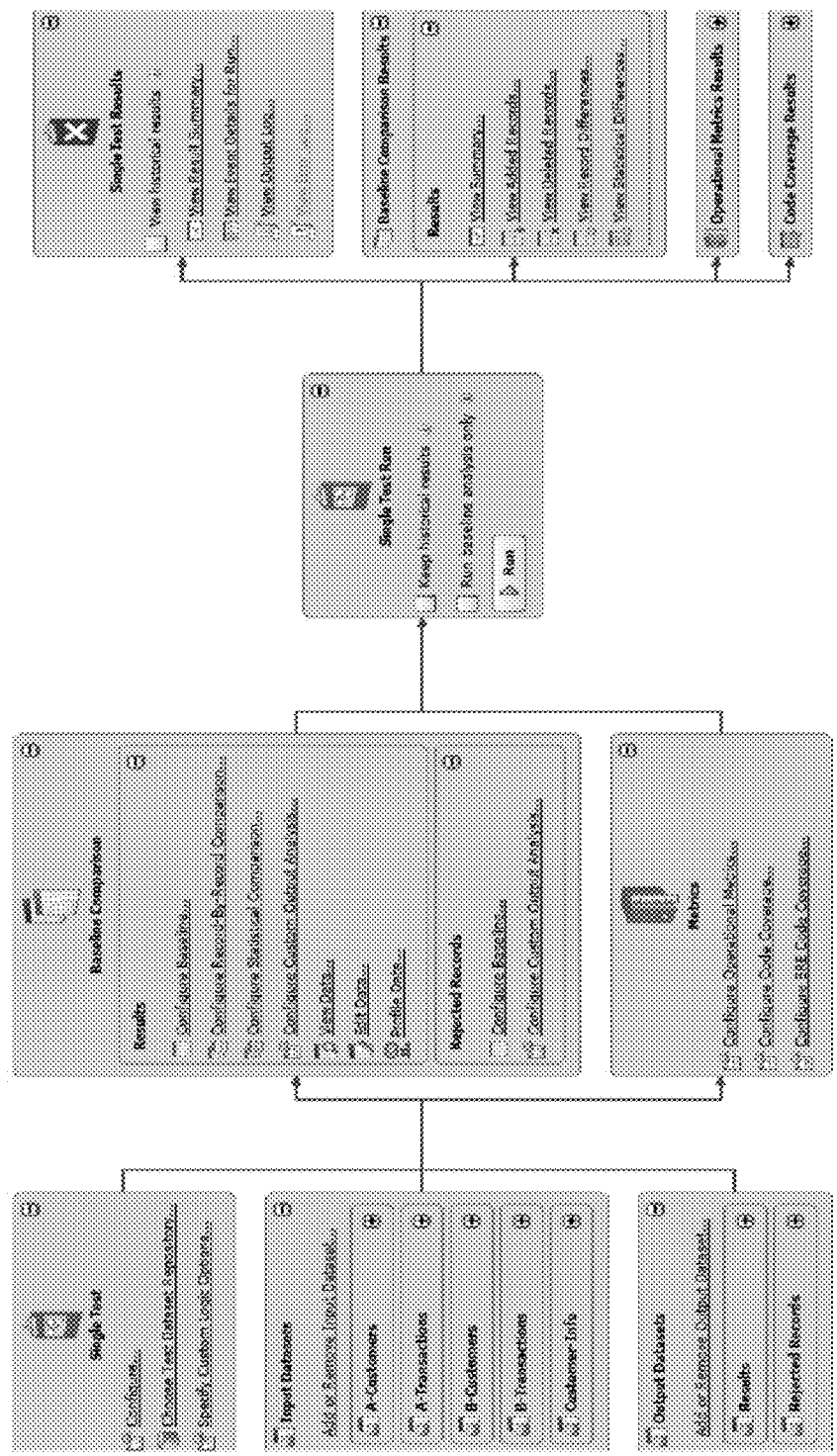
FIG. 3 shows the screen of FIG. 2 with several boxes expanded.

FIG. 2 shows a first screen of a user-interface that the data-driven testing framework 10 provides for use in connection with testing the application 14. The first screen has ten boxes. When clicked on, each of these boxes expands, as shown in FIG. 3, to reveal further boxes that offer the user numerous choices. The boxes in both FIGS. 1 and 2 are arranged in columns from left to right in a manner that conforms to the order of tasks that are generally carried out during testing an application 14.

The first column of FIG. 2 shows a "Single Test" box, an "Input Datasets" box, and an "Output Datasets" box.

As shown in its expanded form in FIG. 3, the "Single Test" box enables a user to configure a particular test, to specify where the test datasets will be kept, and to identify any graphs, plans, or scripts that are to be used to implement custom logic for either set-up or tear-down of the testing environment, or to carry out analysis of test results.

The "Input Datasets" and "Output Datasets" boxes enable the user to specify the locations of the input and output datasets. In general, output datasets are those that the application 14 alters, whereas input datasets are those that the application 14 uses to determine how to alter the output datasets. For example, an application 14 might receive daily reports on revenues from each of a plurality of auto dealerships and might update a database of accumulated revenues. In that case, the database to be updated would be the "output" dataset and the daily revenue reports would be an "input" dataset.

Figure 4:
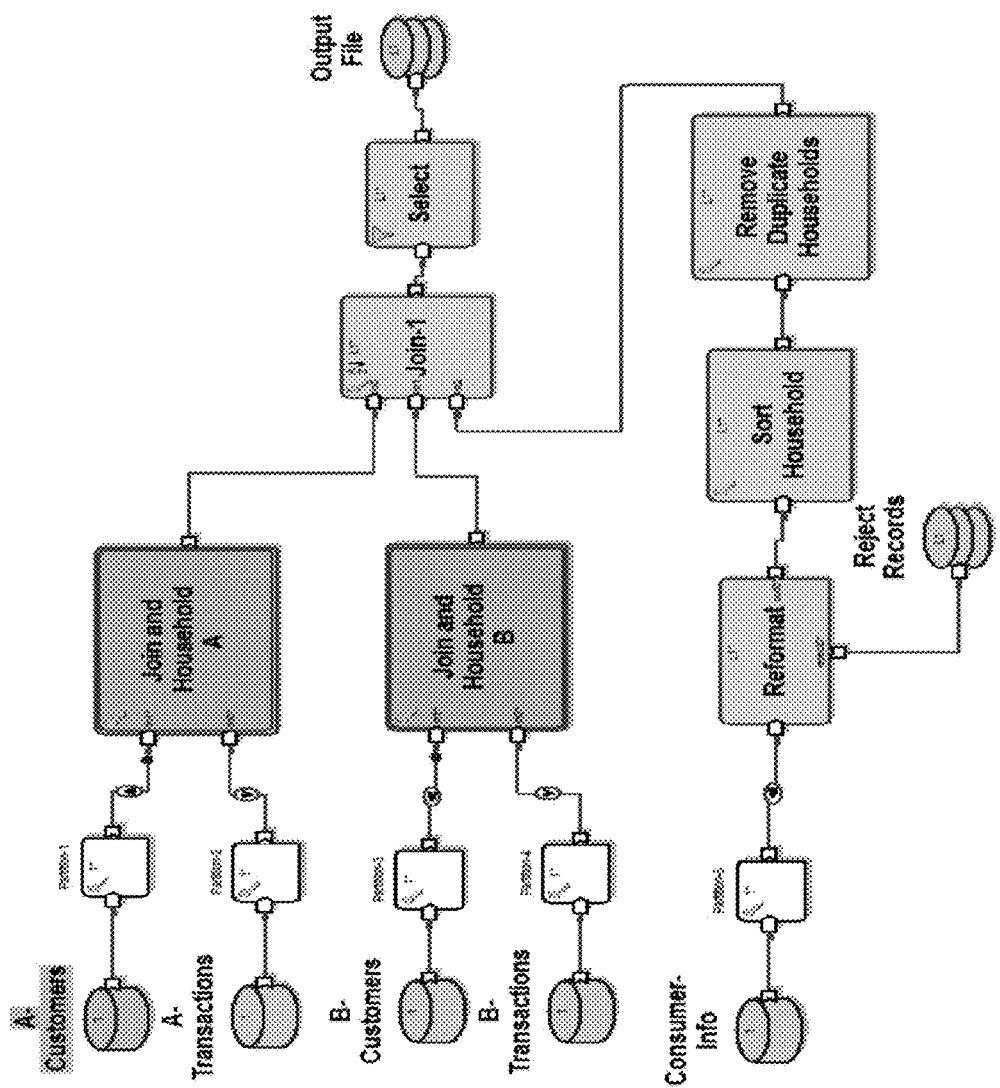
FIG. 4 shows a graph being tested using input and output datafiles specified in FIG. 3.

The particular example shown in FIG. 3 is associated with testing the graph shown in FIG. 4. This graph features five input datasets and two output datasets. In FIG. 3, the names of these datasets are listed in the "Input Datasets" and "Output Datasets" boxes as appropriate.

Figure 5:
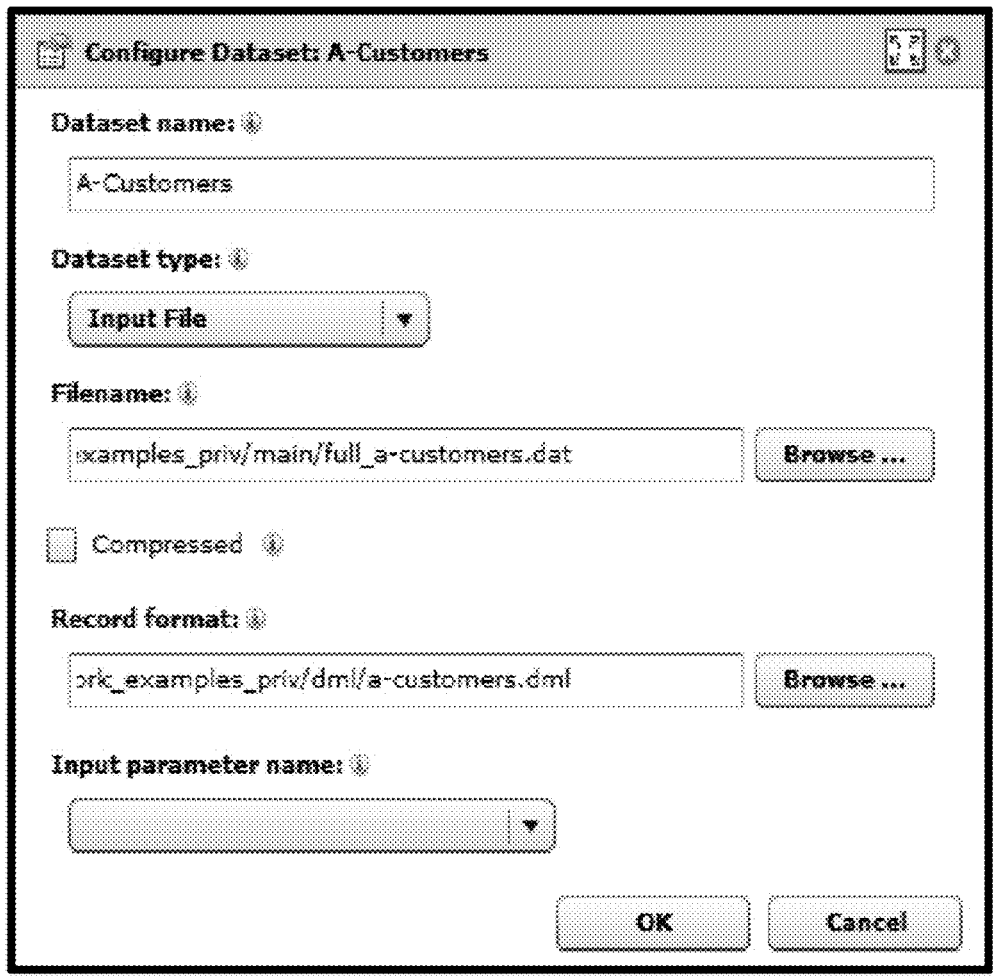
FIG. 5 shows options for configuring an input datafile.

FIG. 5 shows an input-configuration box that displays upon drawing the testing framework's attention to the "A-Customers" database in FIG. 3. The input-configuration box enables the user to identify the dataset's name and type Examples of dataset type include input files and input database tables. The input-configuration box also enables the user to specify the input dataset's state. An example of a dataset state is whether the dataset is compressed or not. The input-configuration box also enables the user to specify the path to the input dataset, and to indicate the record format of the dataset. The testing framework 10 shows a similar box for each of the input and output datasets specified.

When an application operates on data, it typically alters it in some way. Whether or not the application 14 correctly alters the data provides an important clue to whether or not the application 14 is operating correctly. However, it is generally not possible to simply inspect altered data and pronounce it to be correct or incorrect. In general, it is necessary to compare the altered data with other data that is known to be correct. The data that is known to be correct is called the "baseline."

The second column of the first screen contains boxes that are pertinent to checking on whether the application 14 correctly carried out its functions. This second column features a "Baseline Comparison" box and a "Metrics" box.

The "Metrics" box provides options for enabling the user to specify what statistics concerning the execution of the application should be presented. This includes, for example, elapsed time, CPU time, and code coverage.

The "Baseline Comparison" box enables a user to identify the baseline data and to carry out certain operations on it in preparation for its use as a baseline. For example, it may be that the baseline data has certain fields that are not present in the output data, or that certain fields in the baseline data will inherently not match corresponding fields in the output data. An example would be a date/time stamp, which cannot help but be different in both cases.

Figure 6:
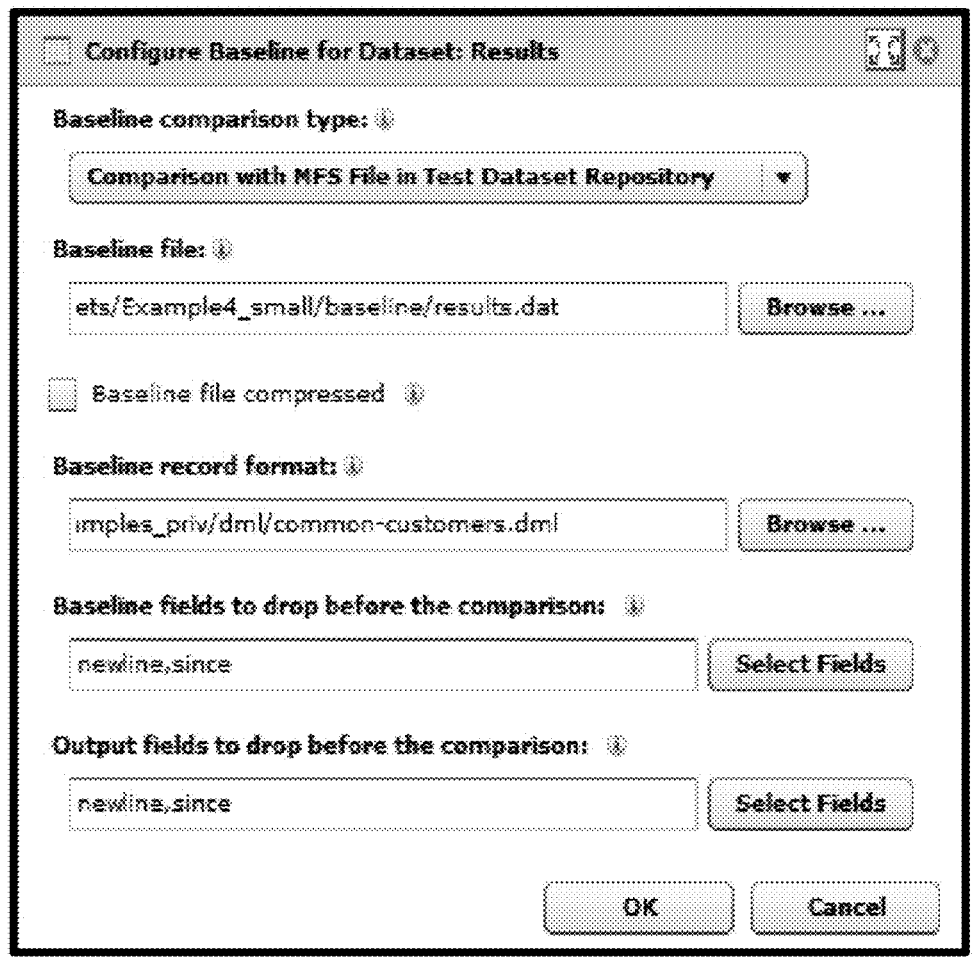
FIG. 6 shows a box for specifying information to configure a baseline.
Figure 7:
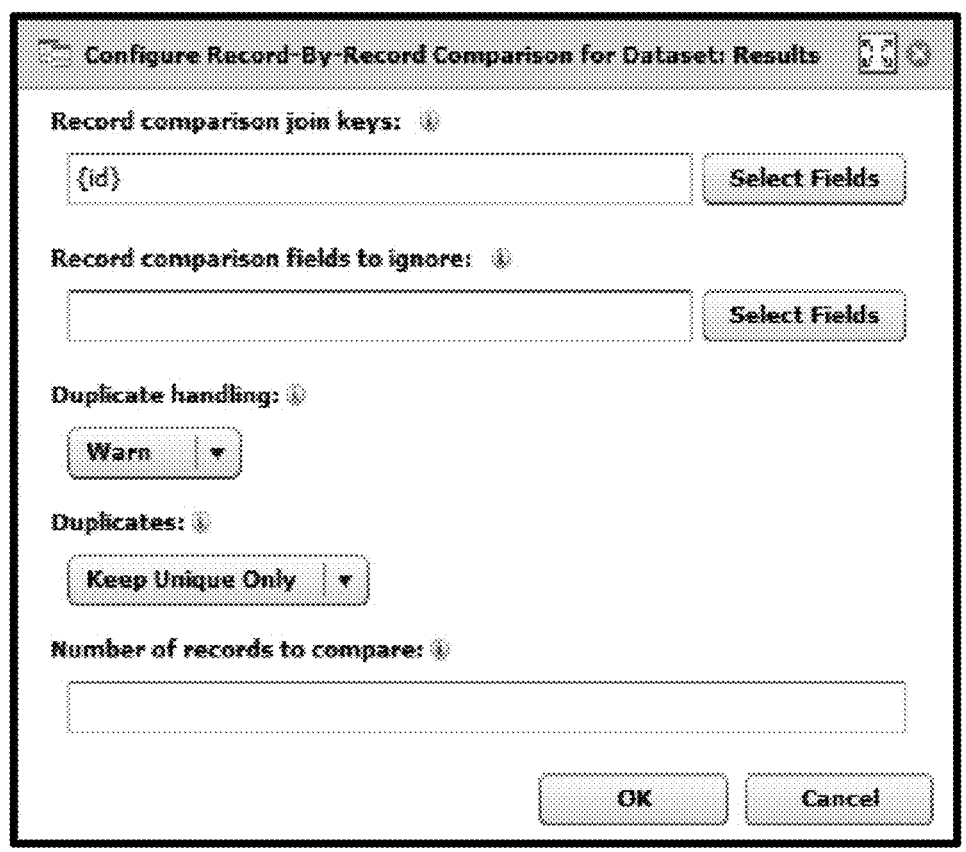
FIG. 7 shows options for record-by-record comparison.

FIG. 6 shows a baseline-configuration box that displays upon drawing the testing framework's attention to the "Configure Baseline . . . " option in the "Baseline Comparison" box in FIG. 3. The baseline-configuration box offers the user a chance to choose the type of comparison. Examples of comparison types would be a comparison between a serial file or an MFS file in a test dataset repository. The baseline-configuration box also offers the user a change to specify where the baseline is located, whether or not it is compressed, its record format, and any baseline fields or output fields to drop before the comparison.

As shown in FIG. 3, there are a two ways to carry out the comparison between the baseline and the output of the application 14. One way is to carry out a record-by-record comparison. This is indicated in FIG. 3 by the option "Configure Record-by-record comparison." Another way is to inspect aggregate data without a record-by-record comparison. This is indicated in FIG. 3 by the option "Configure statistical comparison . . . " An example of this would be determining that the number of records in the dataset corresponds to an expected number of records.

FIG. 6.5 shows the options available upon clicking on "Configure Record-By-Record Comparison" in the "Baseline Comparison" box of FIG. 3. The options available include specifying the keys to be compared, and specifying what fields to exclude in the comparison. This is useful if, for example, a field includes a date/time stamp that will inherently not match since the same time cannot occur more than once.

The third column includes a Single-Test-Run box to control the actual execution of the test. The Single-Test-Run box allows options to keep historical results as well as to run only the baseline analysis.

Figure 8:
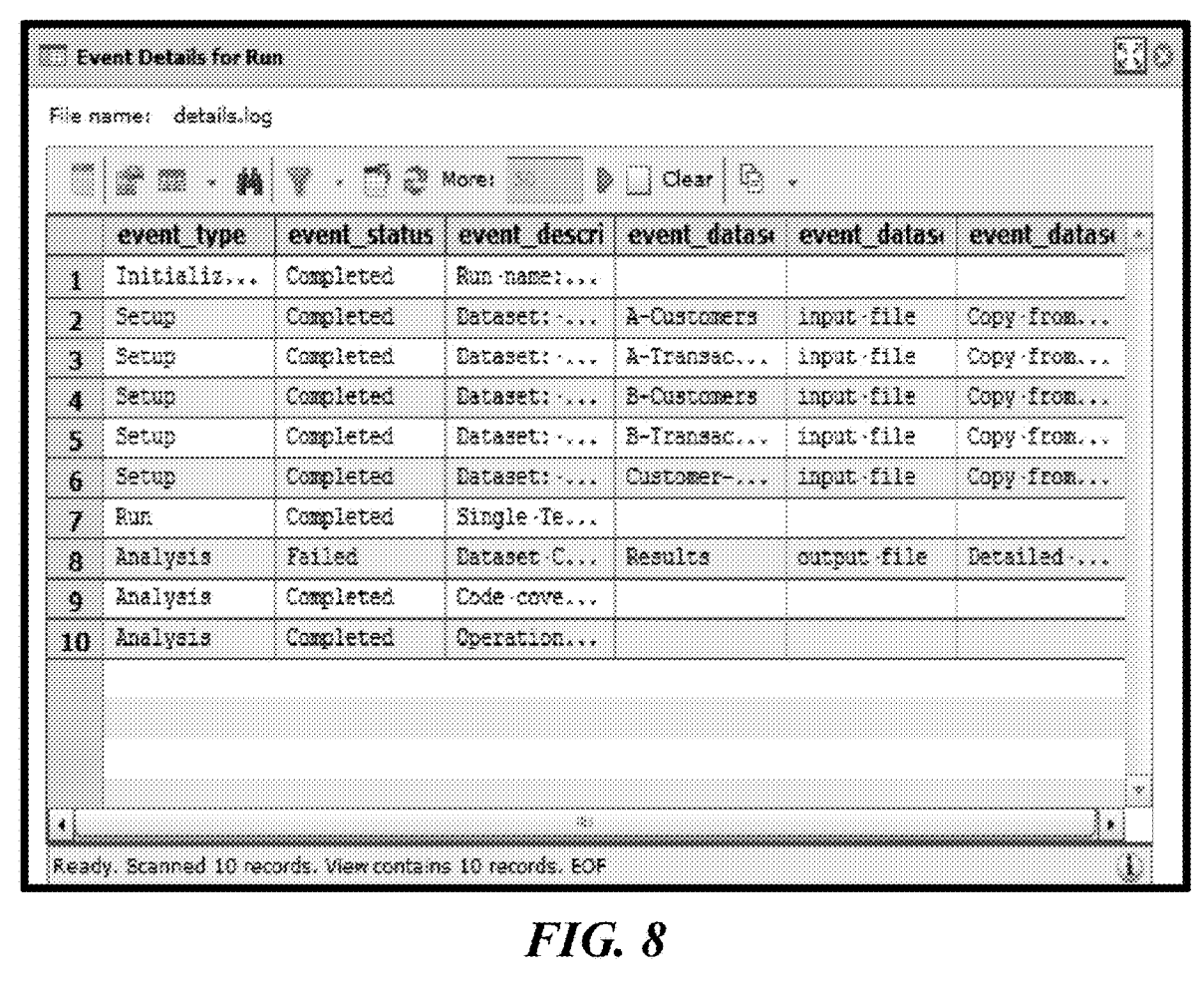

The fourth and last column contains options for analysis of results. A variety of reports can be generated. However, before actually inspecting the results of the test, it is useful to determine whether the test actually ran correctly. In particular, it is useful to confirm that all input and output files were correctly specified, and that steps of setting up the test, actually running it, and analyzing the results were all completed successfully. This can be carried out by choosing "View Event Details for Run" in the "Single Test Results" box in the fourth column. This will yield a report as shown in FIG. 8. According to the illustrated report in FIG. 8, all went well except a particular analysis step. The details of what went wrong can be identified by clicking further into the report.

Figure 9:
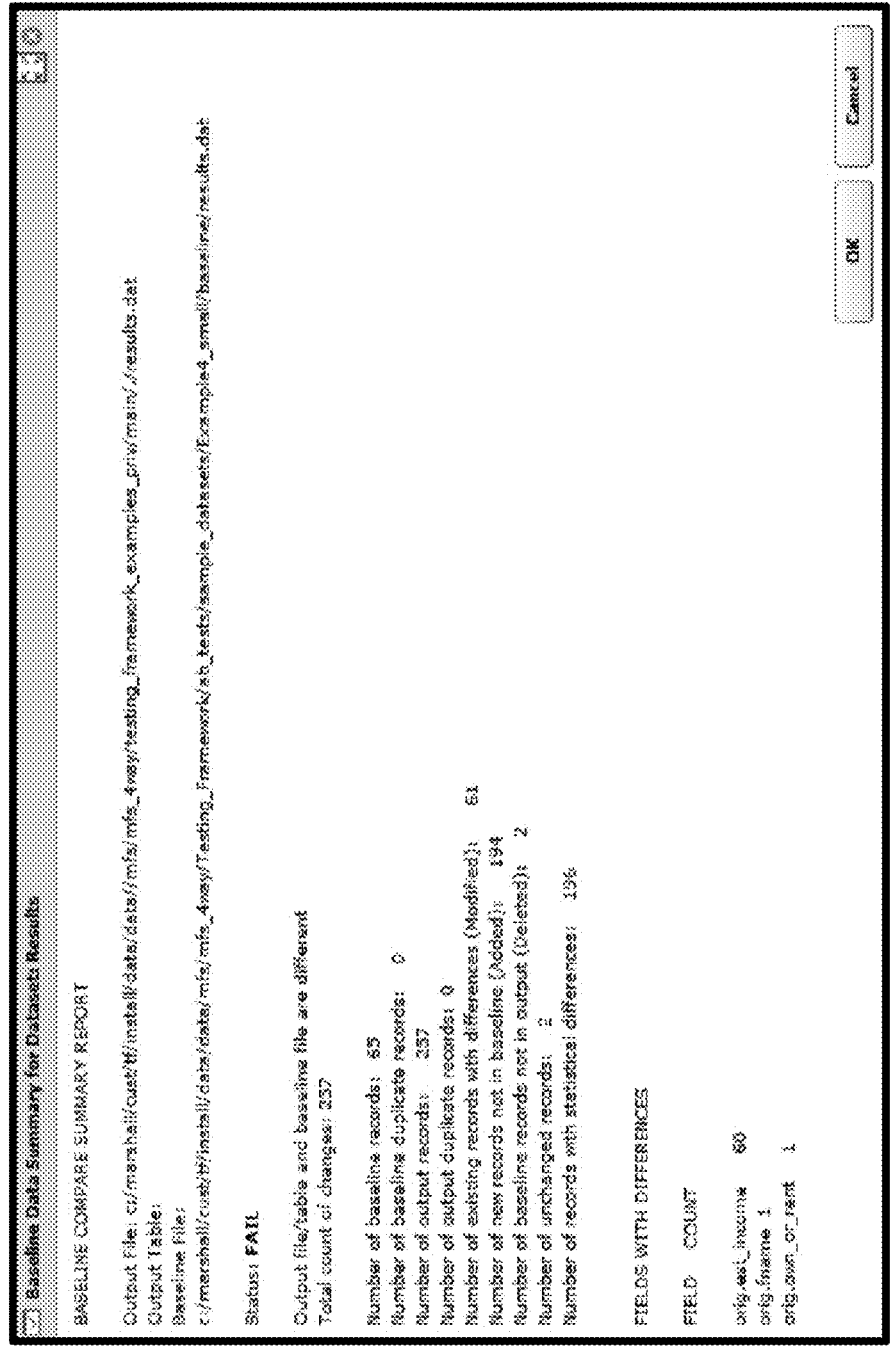
FIG. 9 shows a summary of results of testing an application against a baseline.

After determining whether the test ran to the user's satisfaction, it is possible to inspect reports comparing the result of the test with baseline results. One such report, shown in FIG. 9, is a summary of the comparison between the baseline and the results yielded by testing the application 14. This report is obtained by clicking on "View Summary" in the "Baseline Comparison Results" box in FIG. 3. The report shows the number of baseline records and the number of records with differences. As is apparent, the test results in FIG. 9 suggest that the application tested made numerous errors.

Figure 10:
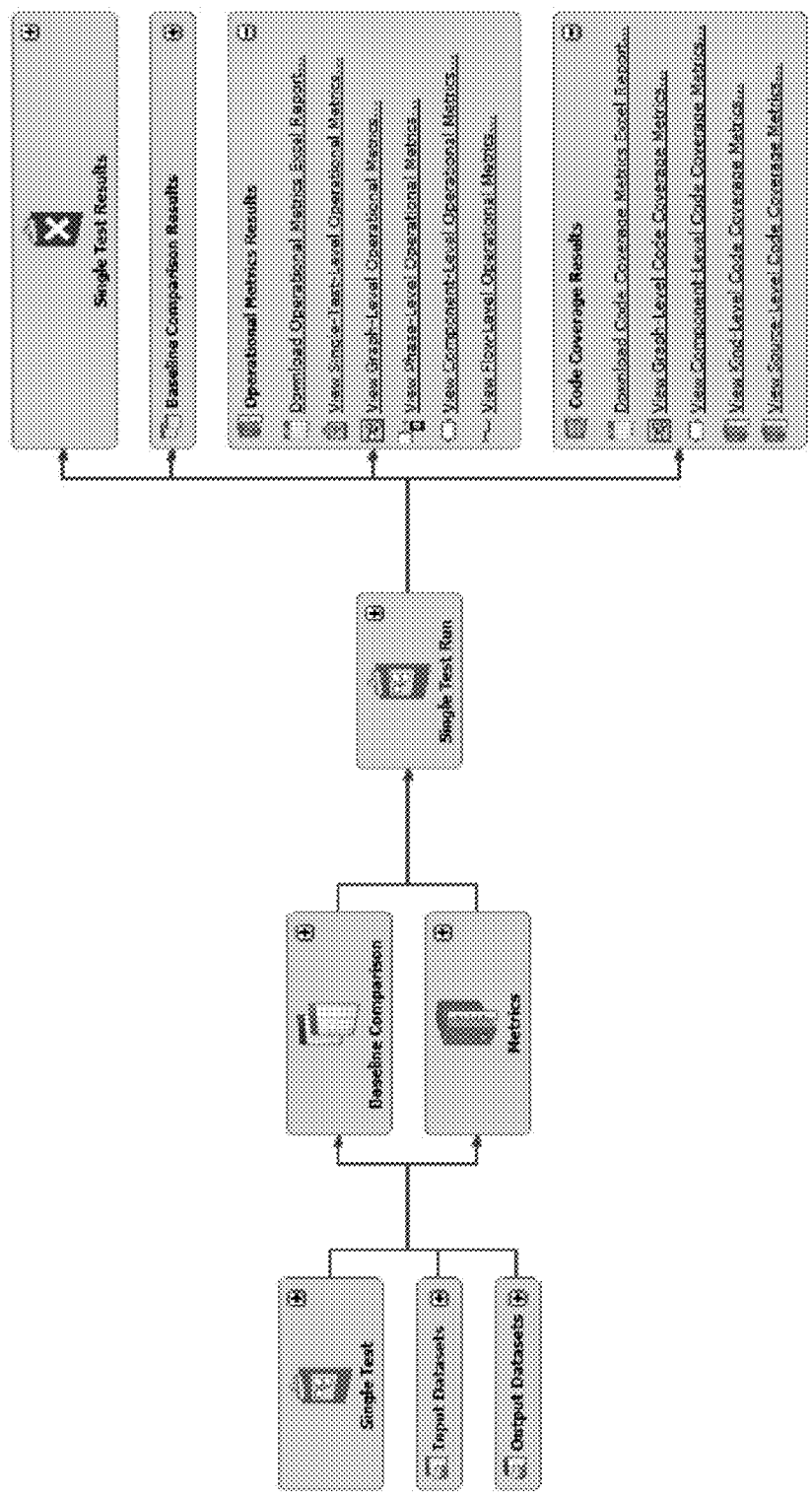
FIG. 10 shows the screen of FIG. 2 with other boxes expanded.

In addition to seeing how many errors the application made and where they occurred, it is also possible to view a report on code coverage. Code coverage can be expressed in a variety of ways, including graph-level, component-level, and kind-level coverage metrics. The available choices can be seen by clicking on the "Code Coverage Results" box in FIG. 3. This expands the box to reveal the choices shown in FIG. 10.

Figure 11:
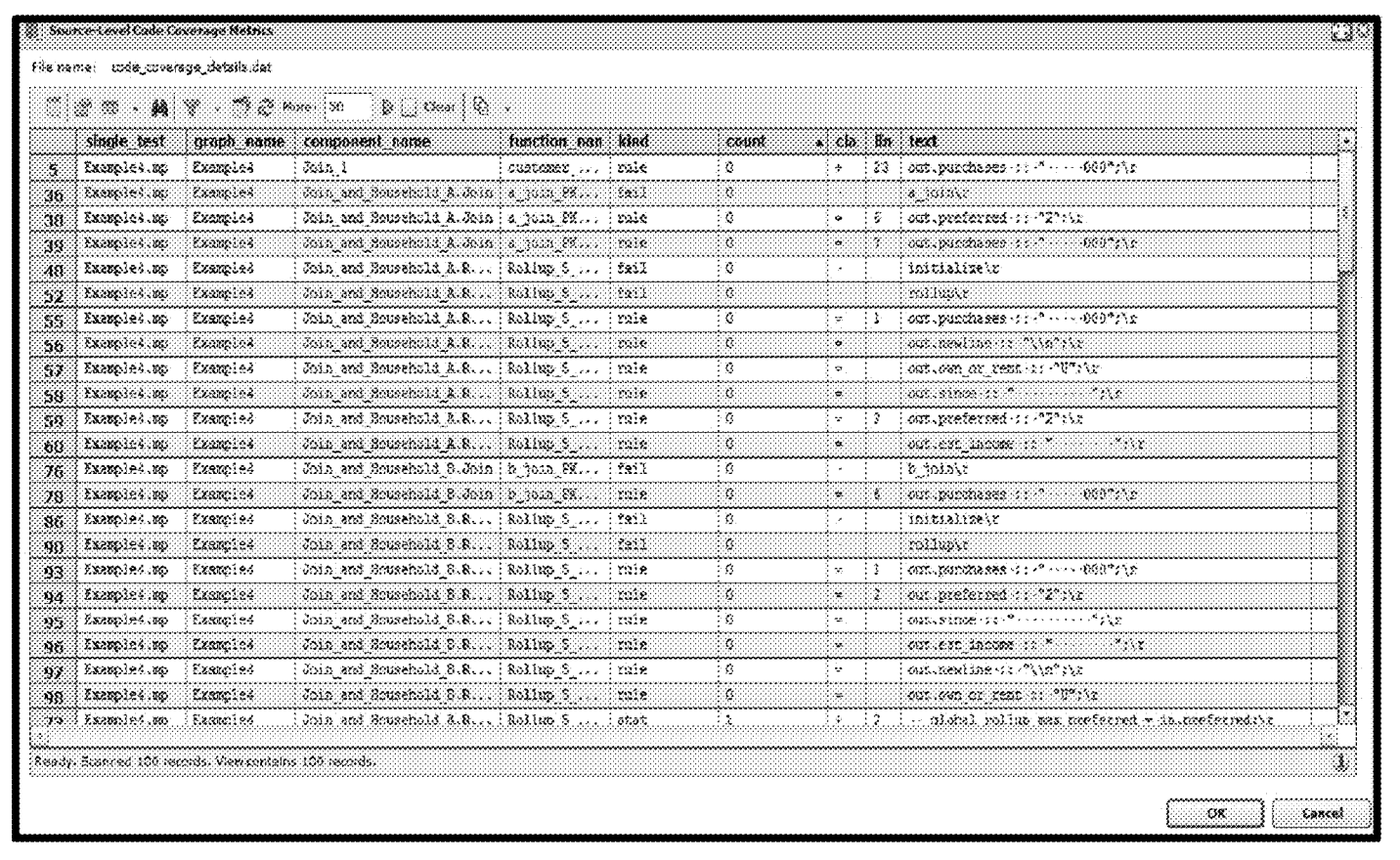

FIG. 11 shows an example of a report for source-level coverage metrics. This report is obtained by clicking on "View Source-Level Code Coverage Metrics" in the "Code Coverage Results" box in FIG. 10.

The illustrated data-driven-testing framework 10 provides the testing computer 12 with functionality that did not exist in the testing computer 12 prior to installation of the data-driven-testing framework 10. In this way, the illustrated data-driven-testing framework 10 provides a significant technical improvement in the operation of the testing computer 12 in which it has been installed.

An application 14 that is to be tested can include object code obtained through compilation of source code. In certain embodiments, this source code represents directed acyclic graphs. In other embodiments, the source code represents plans.

In some embodiments, the source code represents graphs. The nodes of these graphs define processing components having ports connected by directed links to enable flow of data between components. In such graphs, components perform computations by receiving input data on input ports, processing that data, and providing resulting output on output ports.

In some embodiments, the source code represents plans. A plan is directed acyclic graphs in which nodes represent tasks and directed links define dependency relationships between tasks such that downstream tasks cannot begin until upstream tasks are finished. In some embodiments, a task is used to execute a graph.

The compiled source code associated with an application 14 can also include information representing a "pset," or parameter set. A parameter set provides a list of parameters and values corresponding to each of those parameters. In some embodiments, a parameter set is used to provide parameters for customizing a graph.

Applications 14 are not limited to those in which the source code from which they are derived represent data flow graphs, control flow graphs, and plans. Embodiments also include those in which the application 14 comprises object code obtained by suitable compilation or interpretation of source code written in any computer language, such as C code or Java code. Further description of the execution of such applications is provided in Isman, et al., "DATA RECORDS SELECTION," U.S. Patent Publ. 2014-0222752, published Aug. 7, 2014, the contents of which are incorporated herein by reference.

Applications 14 often implement rules whose execution is triggered by the value of one or more variables. These variables might be input variables corresponding to input data. Or they may be derived variables that depend on one or more input variables in the input data. For effective testing of the application, it is sometimes desirable to provide test data that is sufficient to cause execution of every logic rule in the application 14 such that complete code coverage in the application is achieved. It can also be desirable to cause a logic rule to be executed at least a corresponding minimum number of times, or, conversely, to cause a logic rule to be executed no more than a corresponding maximum number of times.

A first impediment to efficient testing is that of acquiring suitable test data upon that, when operated upon by the application 14, will satisfy the foregoing requirements. The particular test data contemplated herein is data that is structured as a series of records, each of which consists of one or more fields.

One way to acquire test data is to use full data volumes pulled from a production system. In principle, this method relies on testing a volume of data that is so large that the probability of omitting the testing of some feature of the code will asymptotically approach zero.

These data volumes were often very large. As a result, each test cycle would take an unreasonably long time.

To overcome the foregoing impediment, the illustrated data-driven-testing framework 10 includes a data engineering module 16 that generates engineered test data for use in testing the application 14. Examples of how to generate engineered test data are described both in Isman, et al, "DATA GENERATION," U.S. Provisional Application 61/917,727, filed on Dec. 18, 2013, and in Isman et al., U.S. Patent Publ. 2014/0222752, "DATA RECORDS SELECTION," U.S. application Ser. No. 13/827,558, filed on Mar. 14, 2013. The contents of both of the foregoing applications are herein incorporated by reference.

The data-driven-testing framework 10 described herein is intended to exploit that discovery that total data volume is not the only thing upon which code coverage depends. In fact, code coverage also depends on the nature of the data itself. In particular, code coverage depends on the logic concentration or logic distribution of that data. In practice, one can usually achieve a desired code coverage using dramatically smaller amounts of data, provided that the data actually used for testing is engineered to have a higher logic concentration.

As used herein, the term "code coverage" is a measure of an extent to which source code has been tested by a test procedure. This can be expressed as a ratio, often expressed as a percentage, of a first value to a second value, where the second value represents a quantitative measure of the total amount of code to be tested and the first represents a quantitative measure of the actual amount to be tested. In some cases, the first and second variables represent features tested to features implemented. In other cases, the first and second variables represent lines of source code tested and total lines of source code. The exact nature of the quantitative measures is obviously not important to an understanding of the invention.

The data-driven-testing framework 10 is not required to achieve any particular code coverage, let alone 100% code coverage. The code coverage is a parameter that is set by the user based on engineering judgment. However, whatever code-testing coverage that user selects, the methods and apparatus described herein will reduce the amount of test data required to achieve that coverage, and will achieve that target code-testing coverage in a more reliable and deterministic way than can possibly be achieved by simple manipulation of the overall volume of production data.

In particular, given a set of test data, certain portions of the code will be exercised. Different test datasets will, in general, exercise different portions of the code. For example, if the test data simply repeats a data record over and over again, it will exercise only a very limited subset of the code. In contrast, test data that contains diverse records with all sorts of combinations of values will be more likely to exercise a larger subset of the code.

The data engineering module 16 includes one or more components selected from a component set. Each component generates engineered test data using a particular method. The choice of what method to use, and hence what component is required, depends on the particular circumstances at hand.

The components of the data engineering module 16 include one or more of a data subsetter 18, a data augmenter 20, a positive-data manufacturer 22, and a negative-data manufacturer 24. The data subsetter 18 generates engineered test data through distillation of existing data so as to increase its logic concentration. The data augmenter 20 generates engineered test data by augmenting existing data. Both the positive-data manufacturer 22 and the negative-data manufacturer 24 create engineered test data based on the test's requirements.

There are cases in which the kinds of data required to test certain logic in the application 14 are not present in the existing data. This does not mean, however, that this logic should never be tested.

If one relies only on test data to exercise this logic, the logic will never be tested. This is because no amount of distillation of the existing data will be guaranteed to yield data that can be used to test that logic. To accommodate these circumstances, certain embodiments of the data engineering module 16 include the negative-data manufacturer 24.

The negative-data manufacturer 24 provides data that would not normally be present. This expands a test's code coverage by enabling the exercise of code that would otherwise never have an opportunity to be tested. A negative-data manufacturer 24 differs from a positive-data manufacturer 22 because the negative-data manufacturer 24 provides data that would not normally be present in a typical dataset (or in a sample of a typical dataset), referred to herein as "negative data". In contrast, the positive-data manufacturer 22 generates data that would normally be present in a typical dataset (or in a sample of a typical dataset), referred to herein as "positive data". Examples of negative data include field entries that are inappropriate to the format of the field, such as a field entry that includes a character that is not in a predefined set of characters for that field, or field entry having a value that is out of predefined range of values for that field, or a field entry that includes an incorrect number of characters in one or more portions of the field entry. An example might be a social-security number that contains a letter, or a birth-month having a value of zero. Other examples of negative data include those that are consistent with the field format but that nevertheless disrupt referential integrity. An example would be a correctly-formatted customer number that does not identify any existing customer. The use of such negative test cases enhances code coverage. However, such negative data is unlikely to be present in a production dataset, and therefore generally will require manufacture.

As a result of having generated engineered-test data, it becomes possible to easily carry out interactive debugging of the application 14 while that application 14 is being developed. This is much more productive than processing large datasets that may take many minutes, or even hours, to run. For example, when engineered test data is used in a localized environment, it becomes possible to see the effect, on each record, of changing rules in a business-rules environment.

The data subsetter 18 yields a set of engineered test data that is small enough so that developers of an application 14 can quickly see the effect of changes made to that application 14. However, the set of engineered test data is more than just small. It also has high test-logic concentration. As a result of its high test-logic concentration, the engineered test data exercises all the code in the application 14 without requiring entire datasets. This results in achieving high code coverage with for the same consumption of computational resources.

Figure 12:
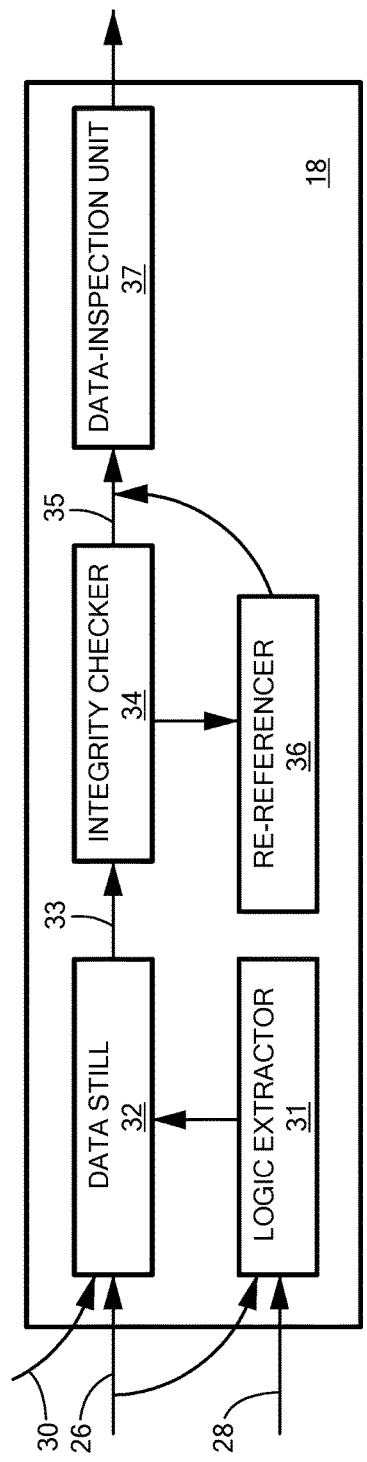
FIG. 12 is an illustration of structural relationships between components of the data subsetter shown in the data-driven testing framework of FIG. 1.

FIG. 12 shows details of a data subsetter 18. The data subsetter 18 receives actual production data 26 (or any input dataset for subsetting), a logic specification 28 and a control variable 30. A logic extractor 31 identifies the logical functions to be tested and provides those to a data still 32, both of which are constituents of the data subsetter 18. The data still 32 then processes the production data 26 to generate a data distillate 33. It does so by extracting those portions that are relevant to testing the logic specified by the logic extractor 31 using an extraction procedure as specified by the control variable 30. Thus, as used herein, the term "data still" is used to refer to a processing module that uses a specified extraction procedure to extract a portion of data from an input dataset, yielding extracted data called the "data distillate."

The data distillate 33 is selected from the production data 26 based on subsetting rules. These subsetting rules can come from several sources. In one example, the user specifies the subsetting rules. In another example, the subsetting rules are formulated based on feedback from execution of an application. In yet another example, the data distillate 33 includes data records that would cause some or all of the code in the application 14 to be executed.

As an example, the production data 26 may include data records, each of which includes fields, with some fields having certain allowed values, some of which are more likely to occur than others. Different allowed values exercise different portions of code. Thus, to exhaustively test the code, all combinations of all values must occur. In some embodiments, engineered test data is derived by causing those less-likely values to be more likely to occur so that not so many records will be required to obtain all combinations of allowed values.

In this case, the engineered test data can be viewed as data in which the probability distribution of values of a record has been made more uniform. In other words, if a particular allowed value occurs with relatively low probability in the production data 26, then that value will occur with higher probability in the engineered test data. Conversely, if a particular allowed value occurs with relatively high probability in the production data 26, that value will occur with lower probability in the engineered test data. This has the net effect of having engineered test data in which the probability of the most likely events is reduced and the probability of the least likely events is increased. This reduces the spread of probability values. The limiting case of this, in which the spread of probability values is zero, is by definition the uniform distribution. A reduction in the overall spread of probability values thus tends to drive the distribution towards the uniform distribution. This tends to result in a more efficient dataset for testing because redundancies caused by more-probable values are reduced while at the same time the volume required to ensure obtaining the least-probable values is reduced. The extent of this efficiency corresponds to the test-logic concentration of the engineered test data.

In many cases, the production data 26 will consist of multiple tables from a database. These tables can be coupled by having a pointer in a first table point to, or "reference," a record in a second table.

Whenever a pointer points to something, there are two possibilities: (1) the pointer points to something valid, and (2) the pointer does not point to something valid.

In the first possibility, each pointer in the first table points to a valid record in the second table. In this first possibility, the two tables are said to have "referential integrity." So, as used herein, the term "referential integrity" is used to describe one or more datasets in which each reference in one portion of the dataset(s) to a value in another portion of the dataset(s) is valid.

In the second possibility described above, at least one pointer in the first table does not point to a valid record in the second table. In this second possibility, the two tables are said to lack referential integrity.

For proper testing, it is preferable that if the production data 26 has referential integrity, so too should the engineered test data. Thus, the data still 32 should provide data distillate 33 that maintains referential integrity.

To determine whether such referential integrity has been maintained, the data still 32 provides the data distillate 33 to an integrity checker 34. If the integrity checker 34 determines that the data distillate 33 has referential integrity, then the data distillate 33 is provided as the output-data subset 35 of the data subsetter 18. Otherwise, it is provided to a re-referencer 36 for repair, after which it is provided as the output-data subset 35.

In some embodiments, the re-referencer 36 implements the same functionality as the data augmenter 20. For example, if a lack of referential integrity occurs because a pointer in one dataset does not point to a record in another dataset, the re-referencer 36 can augment the second dataset with a suitable record using the same methods used by the data augmenter 20. The re-referencer 36 can thus be viewed as an optional constituent of the data engineering module 16.

In the particular embodiment, shown, the data subsetter 18 also includes a data-inspection unit 37 that enables one to view and/or profile the output-data subset 35. However, in other embodiments, there is no data-inspection unit 37.

Among the embodiments that have a data-inspection unit 37 are those in which the data-inspection unit 37 is a viewer and those in which the data-inspection unit 37 is a profiler. Also included in the embodiments that include a data-inspection unit 37 are those in which the data-inspection unit 37 is a structure that is capable of both viewing and profiling based on what the user wishes to do.

As used herein, "profiling" a data subset can include, for example, obtaining metadata, or aggregate data about that subset, and the result of profiling is called a "profile". Aggregate data includes such features as the number of records, the range of values in those records, and statistical or probabilistic descriptions of values within the data, such as $n^{th}$ moments of probability distributions where n is a positive integer.

Sometimes, for example when developing a new system, there is no production data available to distill. In other cases, production data would be very difficult to obtain. To accommodate these circumstances, one activates the positive-data manufacturer 22 of the data engineering module 16.

Figure 13:
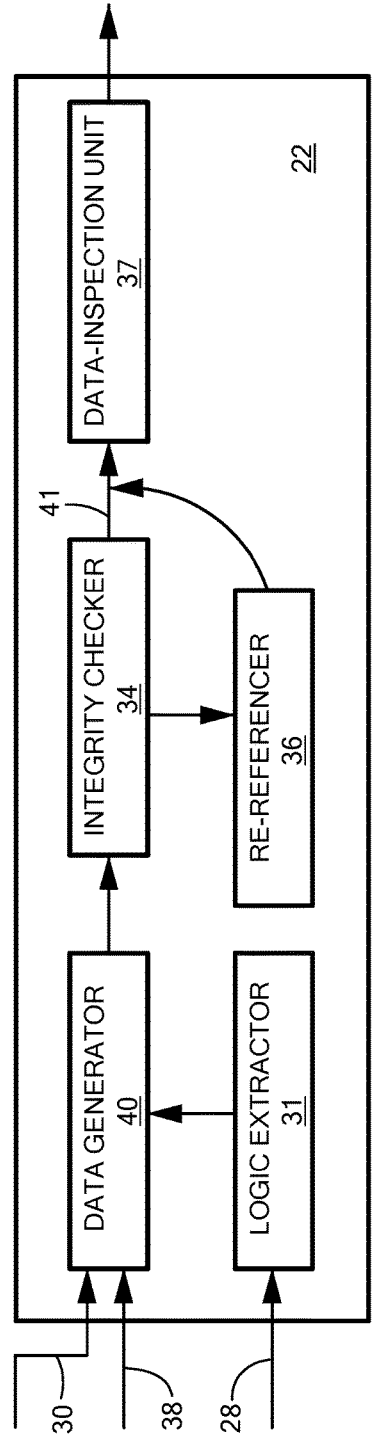
FIG. 13 is an illustration of structural relationships between components of the data manufacturer shown in the data-driven testing framework of FIG. 1.

Referring to FIG. 13, a positive-data manufacturer 22 receives a logic specification 28, a control variable 30, and key-relationship information 38. A logic extractor 31 identifies the logical functions to be tested and provides those to a data generator 40. The data generator 42 then generates suitable test data using an extraction procedure as specified by the control variable 30. Examples of how to generate data are described in Isman, et al, "DATA GENERATION," U.S. Provisional Application 61/917,727, filed on Dec. 18, 2013, and in Isman, et al., "DATA RECORDS SELECTION," U.S. Patent Publ. 2014/0222752, published on Aug. 7, 2014.

Preferably, the resulting manufactured test data 39 has referential integrity for proper testing. Accordingly, the manufactured test data 39 is provided to an integrity checker 34 to determine whether referential integrity has been established. If the integrity checker 34 determines that the manufactured data has referential integrity, then the manufactured test data 39 is provided as a positive-data-manufacturer output 41. If the manufactured test data does not have referential integrity, then the manufactured test data 39 is provided to a re-referencer 36 for repair and then provided as an output of the positive-data manufacturer 22.

In some embodiments, the positive-data manufacturer 22 also includes a data-inspection unit 37 that enables one to view and profile the manufactured test data 39 within the data-driven-testing framework 10. In other embodiments, there is no data-inspection unit.

In some cases, production data 26 exists but not in quite the form that is required. In such cases, it is useful to augment the production data by activating the data augmenter 20 of the data engineering module 16.

The data augmenter 20 can be used, for example, to add one or more fields to existing production data 26 and to generate data to fill those fields based on supplied rules.

Figure 14:
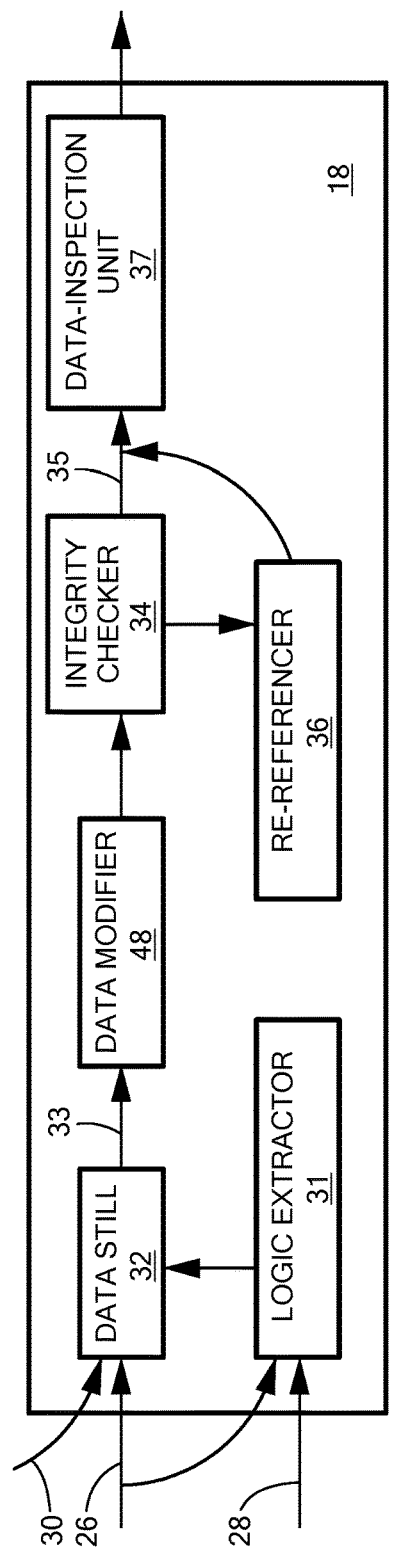
FIG. 14 is an illustration of structural relationships between components of the data augmenter shown in the data-driven testing framework of FIG. 1.

FIG. 14 shows details of a data augmenter 20. The data augmenter 20 receives actual production data 26 (or any input dataset to be augmented), a logic specification 28 and a control variable 30. A logic extractor 31 identifies the logical functions to be tested and provides those to both a data still 32 and to a data modifier 48. The data still 32 then processes the production data 26 so as to extract those portions that are relevant to testing the logic specified by the logic extractor 31 using an extraction procedure as specified by the control variable 30. Based on information provided by the logic extractor 31, the data modifier 48 adds appropriate fields and enters suitable values into those fields, thus generating augmented data 49.

Preferably, the augmented data 49 provided by the data modifier 48 has referential integrity for proper testing. Accordingly, the augmented data 49 provided by the data modifier 48 is provided to an integrity checker 34 to determine whether referential integrity has been maintained. If the integrity checker 34 determines that the augmented data 49 has referential integrity, then the augmented data 49 is provided as augmented-data output 51 of the data augmenter 20. Otherwise, the augmented data 49 is provided to a re-referencer 36 for repair, and then provided as augmented-data output 51 of the data augmenter 20.

In some embodiments, the data augmenter 20 also includes a data-inspection unit 37 that enables one to view and profile the augmented-data output 51 within the data-driven-testing framework 10. In other embodiments, the data augmenter 20 does not have a data-inspection unit.

In some cases, one may wish to exercise code segments that would not be exercised by any data that would normally appear in production data. To carry this out, the data engineering module includes a negative-data manufacturer 24, the function of which is to create such negative test cases.

A second impediment to efficient testing arises from the need to set up, control, and then tear down a testing environment.

In general, testing involves running multiple tests in a test suite and doing so on one or more graphs and plans that interact with many external datasets. These datasets can come from files, tables, queues, multi-files and web services. To accomplish the task of causing the application 14 to execute test suites, the data-driven testing framework 10 provides a computational environment manager 44.

The computational environment manager 44 carries out the task of running the application 14 in a controlled manner with known inputs in a known environment. This provides flexibility in specifying the particular application 14 to be tested. The computational environment manager 44 maintains a repository folder that contains aggregate data corresponding to input data to be processed by the application 14, data flags, an output directory, and customizable logic for setup, teardown, and reporting.

The computational environment manager 44 automatically sets up the datasets as files or tables. These datasets include the sources of data, namely the data on which the application 14 will operate, and the targets, namely where the results of processing by the application 14 will ultimately be placed. The environment manager 44 then automatically sets the source and the target into correct initial states, runs the application 14 using an appropriate test suite, places the results in the target, and restores the environment to its pre-set condition. In some cases, the environment manager 44 backs up the prior environment and restores it after the test is completed.

The automated set-up and teardown of an environment facilitates repeated testing with a minimum of manual labor.

A computer system can be viewed as a set of nested layers of ever-increasing abstraction. Each layer creates logical constructs that can be made use of by layers at a higher level of abstraction. These include memory states and values of environmental variables.

When an application executes, it can be viewed as executing on these layers. The set of logical constructs created by the lower layers can be viewed as an environment in which the application executes. For proper testing of an application, it is preferable to maintain the same environment in much the same way that proper testing of a physical structure often depends on maintaining a constant physical environment.

Figure 15:
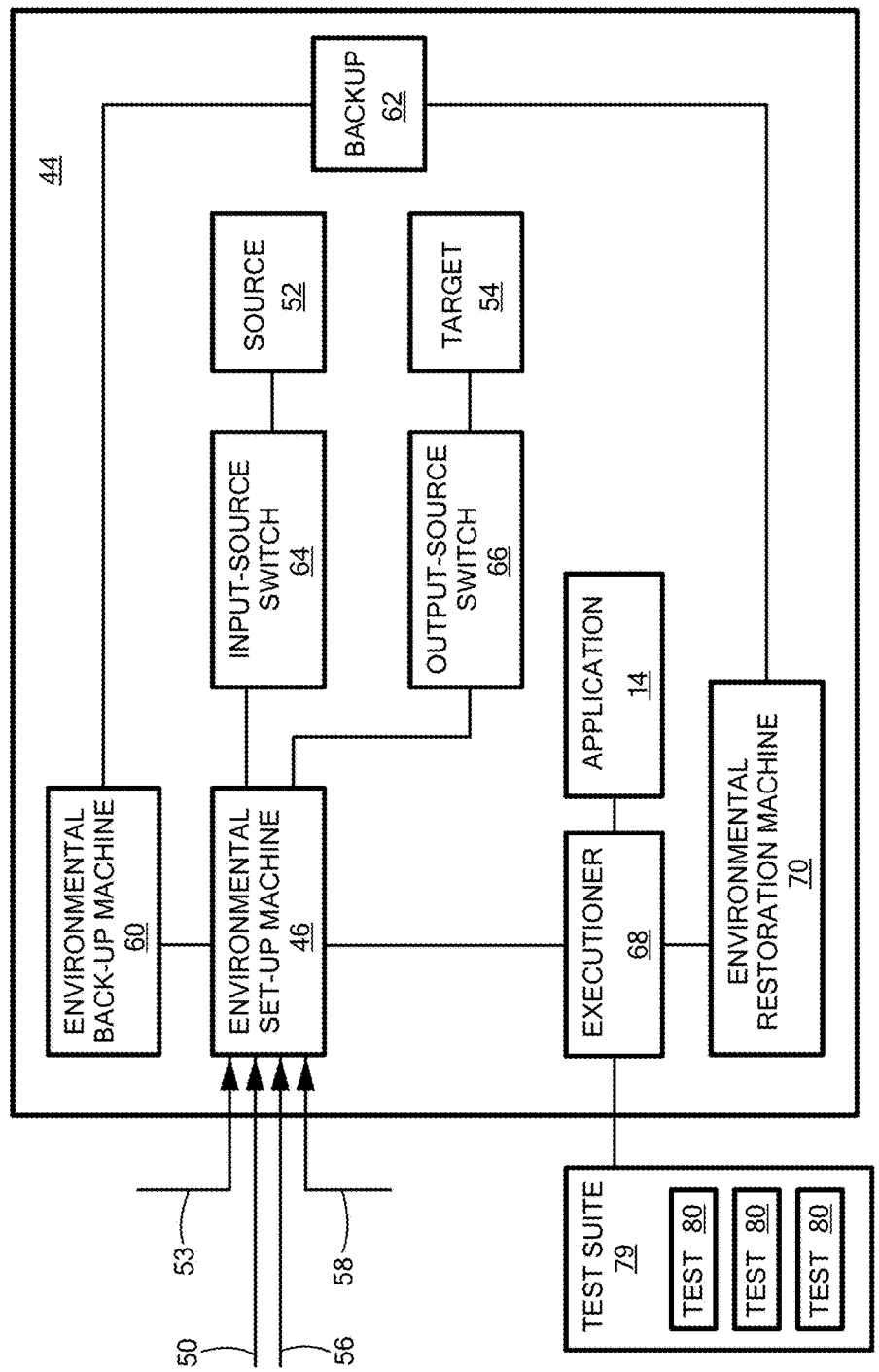
FIG. 15 is an illustration of structural relationships between components of the environmental management machine of the data-driven testing framework in FIG. 1.

Referring now to FIG. 15, in one embodiment, the computational environment manager 44 includes an environmental-transition machine 46 that causes two environmental transitions: one during a set-up phase and another during a teardown phase.

The environmental-transition machine 46 receives an input specification 53 and an output specification 50. The input specification 53 identifies a source 52 from which the input test data is to come. This input can be files, multi-files, queues, web services, or any combination thereof. The output specification 50 identifies a target 54 where the output of the testing is supposed to be placed. The environmental-transition machine 46 also receives an initialization signal 56 that contains information on the initial states of input, the output, and any environmental variables. Finally, the environmental-transition machine 46 receives a test signal 58 to indicate the start of the test.

In some embodiments, during the set-up phase, the environmental-transition machine 46 copies test data and/or baseline data from a first data repository into the source 52, where it is stored during the actual testing procedure. After the testing procedure is complete, the teardown phase begins. During this teardown phase, the environmental-transition machine 46 deletes the test data from the target 54.

Upon receiving the test signal 58, the environmental-transition machine 46 communicates with an environmental-backup machine 60 to create a backup 62 of the environment. This is followed by causing an input-source switch 64 to point to an appropriate source 52, and causing an output-source switch 66 to point to an appropriate target 54.

Upon completion of these tasks, the environmental-transition machine 46 signals an executioner 68 to cause the application 14 to execute a test suite 79 that includes one or more tests 80. In some practices, execution of a test suite includes automated execution of one or more scripts. Upon completion of execution, the executioner 68 signals an environmental-restoration machine 70, which then retrieves the backup 62 and restores the environment to its initial state.

In the course of execution, the application 14 implements one or more rules. In some embodiments, a rule is specified by a specification that includes at least a condition expression and an execution expression. When the condition expression is evaluated as "true," the application 14 proceeds to evaluate the execution expression. But whether or not a condition expression is evaluated as "true" may depend the value of one or more variables in the data. These variables can be input variables corresponding to input data. Or they can be derived variables that depend on one or more input variables. Whether or not the application 14 executes a rule during a particular testing exercise thus ultimately depends on whether the choice of test data has variables that will cause a conditional expression corresponding to the rule to be evaluated to "true."

In some examples, the application 14 executes all of the rules that are triggered. In other examples, the application 14 executes fewer than all of the rules that are triggered. Rules are described in more detail between col. 5, line 61 and col. 6, line 11 of U.S. Pat. No. 8,069,129, filed Apr. 10, 2007, the contents of which are incorporated herein by reference.

Once the executioner 68 has completed the test suite 79, a result analysis module 72 takes over and begins the analysis of test results. Among the functions of the result analysis module 72 is that of creating these known sets of correct results and automating the process of checking that the application 14 being tested ultimately arrives at the correct answers.

In some cases, there is an older version of the application being tested. This older version of the application being tested is typically the version in current use. As such, it can be regarded as a gold-standard to establish veracity of output. Accordingly, this older version of the application, which is intended to be replaced by the application being tested, will be referred to as the "gold-standard version."

If the version of the application that is being tested does not give results that are consistent with those obtained by the gold-standard version when executed on the same data using the same environment, then an inference can be made that the version of the application that is being tested outputting incorrect results.

One step that arises in testing an application 14 is that of determining whether the application 14 has in fact processed the data correctly. To execute this step, there must be a way to establish some correspondence between an expected result of operation on a dataset, which is defined by a functional specification of the application 14, and a measured result of operation on the same dataset, as obtained by the executioner 68. In other words, one needs to obtain a baseline 74 of correct answers. Once such a baseline 74 is available, the result analysis module 72 checks results 78 by comparing them with the baseline 74.

Methods of obtaining a baseline 74 depend in part on how different the application 14 is from whatever it is replacing. In general, the greater the difference, the more difficult it becomes to generate the baseline.

At an abstract level, given a dataset X and an environment E, version n of an application f will generate an output $Y=f_n(X,E)$. The problem is how to determine if Y is correct.

In general, there are three possibilities.

The first possibility is that there exists a different version of the application, namely version m, that can operate on (X,E). If version m is considered reliable, then one establishes the veracity of the result Y by asking if $f_n(X,E)=f_m(X,E)$.

The second possibility is that there exists another version of the application, namely version m, that is not considered completely reliable. In that case, one must ask if $f_n(Z,E)=f_m(Z,E)$, where $Z \subset X$ and where $f_m(X,E)$ is considered reliable for Z but not for $Z^C$, where $Z^C$ is the complement of Z. To establish the veracity of $f_n(Z^C,E)$, one must typically determine the correct results manually.

The third possibility is that there is no version of the application that is known to be reliable. This is simply the degenerate case of the second possibility, where $Z=\emptyset$. In that case, the procedure for determining the correct results is carried out manually.

One method of obtaining a baseline 74 is useful when the application 14 under test is intended to replace an existing application with essentially the same functionality. This corresponds to the first possibility defined above. In that case, the baseline 74 can come from the results generated by the gold-standard version of the application.

In some cases, the application 14 that is under test represents an enhancement to an existing application. The enhancement is such that the application 14 that is under test is expected to, and in fact intended to, yield different results. This situation, which corresponds to the second possibility above, may arise, for example, if the gold-standard version had a bug that caused incorrect answers and the application 14 under test is intended to fix that bug.

For these cases, the result analysis module 72 reports which fields have changed and/or whether the number of records in the output has changed. The result analysis module 72 reports any mismatch so that one can immediately recognize if some fields have inadvertently changed when they were not supposed to. For those fields that were expected to change, human intervention can be required to determine the correct answers and to cause them to be entered into the baseline 74.

In other cases, the application 14 under test is a brand new system. This corresponds to the third possibility outlined above. As a result, there is no existing output data that can be used as a basis for creating a baseline 74.

In this case, the baseline 74 is built by starting with existing production data 26 and entering correct results (e.g., manually) for a subset of that production data 26. This is accomplished by looking at the underlying logic of the application 14 to be tested, and, based on that logic, identifying those fields in the source data that are likely to be most affected by the various logic paths through the application 14. These are the fields that should be picked when selecting a subset of the data.

In some cases, certain simple tests can automatically be carried out without having to inspect a baseline 74. For example, if an application 14 is known to produce one record of output for each record of input, the application 14 can be made to operate on production data 26 of known cardinality, in which case the cardinality of the output data will provide some information on the functioning of the application 14. In particular, to the extent there exists a non-zero difference between the respective cardinalities of the production data 26 and that yielded by operation upon the production data 26 with the application 14 the result analysis module 72 can automatically signal the possibility of a flaw in the implementation of the application 14.

For example, in certain cases, the application 14 is intended to generate an output that includes several constituents of different cardinalities where a relationship exists between those different cardinalities. In one example, an application 14 operates on input in the source 52 and generates two separate tables in the target 54. To the extent there exists a relationship between the cardinalities of those two tables, the result analysis module 72 automatically detects such a difference and outputs information indicative of a flaw in the implementation of the application 14.

In another example, an input table in the source 52 may have N records. If it is known that the output table in the target 54 should also have N records, then checking the number of records in the output table is a good way to check on how well the software worked. For example, if one observed that there were N+1 records in the output when there were only N records in the input, this would suggest an error.

In another example, which is a generalization of the foregoing example, the application is known to change the number of records in some deterministic way. Thus, in general, if the output number of records for an AT-record input table is f(N) for some known function f, then one way to identify an error in the application is to see if in fact the output table has f(N) records when the input table has N records.

After execution, it is useful to provide a report that provides information indicative of the execution of the application 14, and in particular, information concerning the interaction of the application 14 with the test data provided to it. Examples of such information could include rules that the application 14 did or did not execute, a number of times each rule in the application 14 was executed, or any other information that would shed light on the interactions between the application 14 and the test data.

Based on the report, it is possible for the user to identify additional test data. This additional test data could, for example, be data that would have caused any unexecuted rules to be executed, or data that would have caused a particular logic rule to be executed a specified number of times, or data that would have caused another desired execution result. The user could then formulate new sub-setting rules to cause selection of an updated subset of data records according to those additional subsetting rules. The updated subset of data records may include data records sufficient to cause execution of some or all of the previously unexecuted rules, data records sufficient to cause execution of some or all of the rules a specified number of times, or data records sufficient to cause another desired execution result.

Among the kinds of information that can be provided by the result analysis module 72 is a report on the extent to which the test data exercised the code. This report includes an aggregate score, such as the percentage of lines of code tested, as well as more detailed information, such as which lines of code were not tested. This information enables the user to decide whether the testing has been adequate, both in terms of the percentage of code tested, and the importance of the code omitted from the testing.

Figure 16:
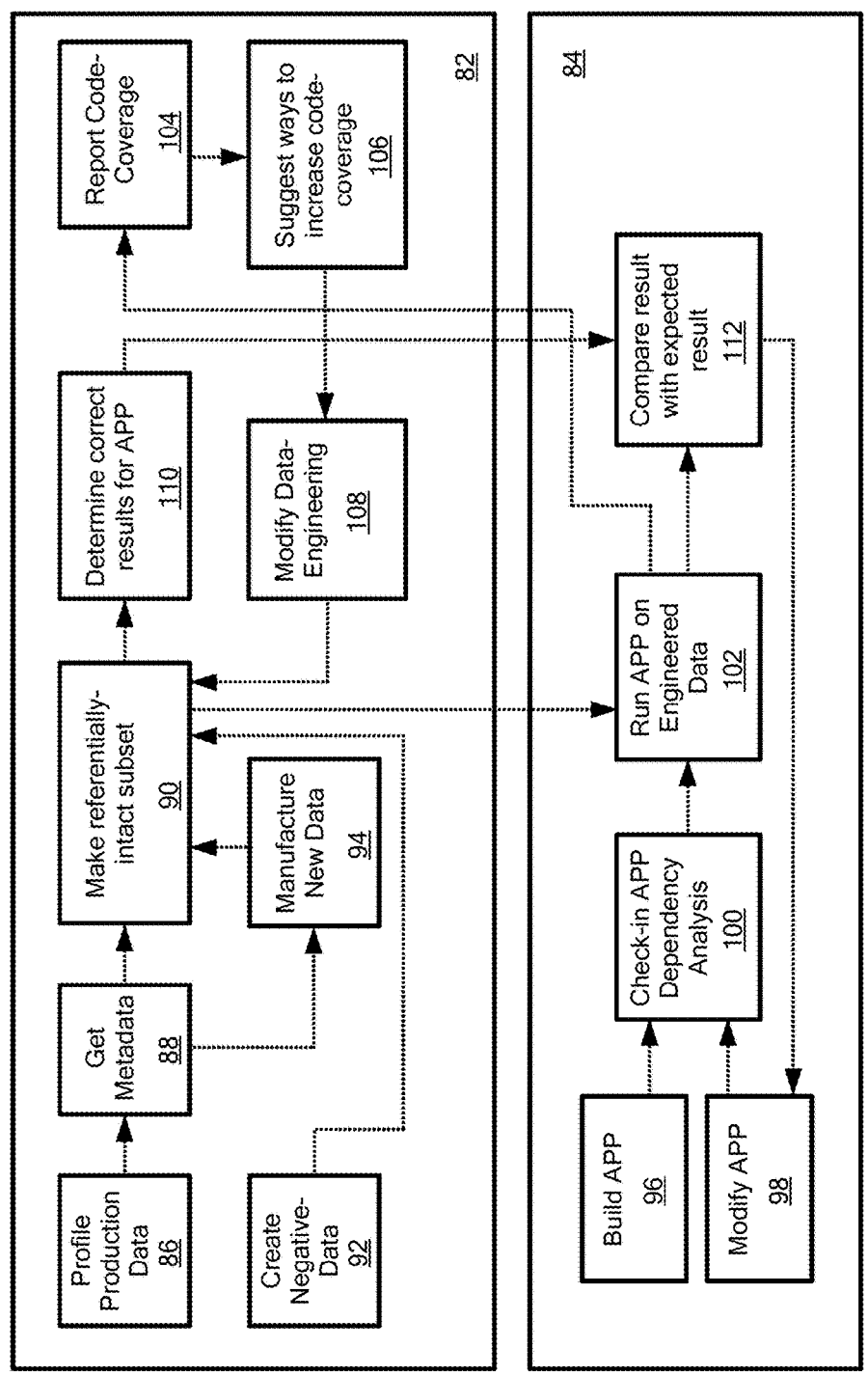
FIG. 16 is an overview of an efficient testing procedure.

FIG. 16 provides an overall summary of an efficient testing procedure that makes use of the components described herein. The testing procedure divides generally into data-related steps 82, and application-related steps 84.

The data-related steps 82 include running a profile on any existing production data. This is identified as step 86, which is identified by the text: "Profile Production Data" in FIG. 16.

The next data-related step is to obtain, from that profile, certain aggregate data concerning the production data. This step is identified in FIG. 16 as step 88, which is identified by the text: "Get Metadata." It is understood that "metadata" refers to aggregate data. Examples of such aggregate data include but are not limited to a list of keys, field cardinality, and ranges of values.

This metadata, or "aggregate data," is used to generate a referentially intact subset of the data, as identified in FIG. 16 at step 90, which is identified by the text: "Make referentially-intact subset".

Some practices include augmenting the referentially intact data subset by creating and including negative test data. This is indicated in FIG. 16 by step 92, which is identified by the text: "Create Negative-Data."

Other practices include augmenting the referentially intact data subset by manufacture of synthetic data. This is indicated in FIG. 16 by step 94, which is identified by the text: "Manufacture New Data."

The application-related steps 84 include either building the application or modifying an existing application by fixing or enhancing it in some way. The step of building the application is shown in FIG. 16 as step 96, and identified by the text "Build APP." The step of modifying an existing application by fixing or enhancing it in some way is shown in FIG. 16 as step 98, and identified by the text "Modify APP." The abbreviation "APP" throughout FIG. 16 is understood to refer to application 14.

The application-related steps 84 also include the step of checking the application 14 into a repository together with a dependency analysis, which represents how the computational modules of the application and the datasets accessed or produced by the application depend on each other. This is shown in FIG. 16 as step 100 and labeled with the text: "Check-in APP, Dependency Analysis."

The application is then made to operate on the engineered test data, as indicated in FIG. 16 with step 102, which is labeled: "Run APP on Engineered Data."

The results are inspected to determine code coverage, as shown in FIG. 16 at step 104, which is labeled with the text: "Report Code Coverage."

Based on these coverage reports, the data-driven testing framework 10 provides suggestions of modifications that could be made to the test data to provide better code coverage. This is shown in FIG. 16 at step 106, which is labeled with the text "Suggest ways to increase code-coverage."

The result of step 106 optionally results in modifying the data-engineering procedure, either by creation of additional data or changes in the manner in which a subset of data is extracted from existing data. This step is identified in FIG. 16 as step 108 and labeled: "Modify Data-Engineering."

Additionally, the integrity of the output data is evaluated by comparing it with the baseline 74, a step shown in FIG. 16 as step 110 and labeled: "Determine correct results for APP."

To the extent the results differ, the application 14 is modified to eliminate the difference as shown in FIG. 16 by step 98, which is marked by the text: "Modify application." Determination of whether there is a difference is carried out in a step identified in FIG. 16 by reference numeral "112" and labeled with the text: "Compare result with expected result.

In some embodiments, the data still 32 distills the production data 26 according to one or more subsetting rules. A subsetting rule is a rule that causes the data still 32 to identify a subset of data records to be selected from a larger set of data records. The resulting data distillate 33 is thus both less voluminous than the original data, and higher in test-logic concentration. This ultimately leads to more efficient testing because, when the application 14 operates on the data distillate 33, greater code coverage can be achieved with lower volumes of data.

The subsetting rules that the data still 32 relies upon can originate internally, from within the data engineering module 16, from elsewhere within the data-driven-testing framework 10, or from an external source.

In one example, the subsetting rules are provided by the logic extractor 31, which uses the logic specification 28 to profile data records and to formulate subsetting rules based on an analysis of the resulting profile. These subsetting rules are then provided to the data still 32, which then uses them to create data distillate 33.

In another example, subsetting rules come from the result analysis module 72, which relies on information containing the results of having executed the application 14 on particular test data. The data subsetter 18 then formulates subsetting rules based on an analysis of these results, for example, based on a report from the result analysis module 72. These rules are ultimately executed by the data still 32 to create data distillate 33.

In yet another example, instead of formulating the subsetting rules, the data subsetter 18 receives them from an external source. In some cases, the data subsetter 18 receives the subsetting rules directly from a user who is actually sitting at the testing computer 12 and manually specifying them through a user-interface. In other cases, the data subsetter 18 obtains the subsetting rules by having the testing computer 12 read them from a non-transitory computer-readable storage medium, such as a hard disk, or having the testing computer 12 receive them via a non-transitory computer-accessible transmission medium, such as a network, including a wide-area network such as the Internet.

Whether received externally or generated internally, a subsetting rule is either atomic or molecular. An atomic subsetting rule cannot be broken down into further subsetting rules. A molecular subsetting rule consists of a combination of two or more atomic or molecular subsetting rules. Typically, Boolean operators join the atomic subsetting rules to form the molecular subsetting rules.

A subsetting rule is also either deterministic or stochastic. An example of a deterministic subsetting rule is a rule that causes selection of all records matching a particular criterion. An example of a stochastic subsetting rule is one that specifies that, of all the records that match a particular criterion, two of those records are to be selected at random.

In some examples, a subsetting rule designates one or more target data fields and specifies that each distinct value or value classification for the target data fields be included in the data distillate 33. To implement this example, the data still 32 identifies each distinct value for the target data fields in the data records and creates a data distillate 33 that only has those data records that satisfy the subsetting rule.

For instance, a "state" data field, which has a distinct value for each of the fifty states, and a "gender" data field, which has two distinct values, can be identified as target data fields. In this case, the data still 32 selects data records for the data distillate 33 such that each of the fifty values for "state" and each of the two values for "gender" are included in at least one data record in the data distillate 33.

In some examples, the data subsetter 18 implements a subsetting rule that specifies a type of relationship among data records within the same set of data records or between different sets of data records. In these examples, the data still 32 selects data records based on their relationship with other data records selected for the subset. For instance, the data still 32 may select, for inclusion in the data distillate 33, data records that share a common value for a customer identifier data field.

The data subsetter 18 can also implement a subsetting rule that relies on filtering. In these cases, the data still 32 includes, within the data distillate 33, records that have particular values in certain target fields. For example, the data still 32 may select records such that each value of "state" is represented at least once. Or, the data still 32 may apply an apportioning scheme by considering the value of a field "population" and selecting data records such that the number of records having a value "state" depends on the value of "population" associated with that state.

In some examples, a user, such as a data analyst or application developer, provides subsetting rules. For instance, a user can identify target fields or specify relationships among data records and provide such a specification to the data subsetter 18.

In other examples, the data subsetter 18 profiles the data records and carries out an analysis of the profile to identify or formulate suitable data subsetting rules. To carry out the profiling, the data subsetter 18 accesses the relevant data records and analyzes certain features thereof to generate a profile of the data records. These features include one or more of the following: individual data records of a single dataset, relationships among data fields within a set of data records, and relationships among data fields across different sets of data records.

A profile of a set of data records is a summary of data in the set of data records. This summary can be provided on a field-by-field basis. The profile can include information characterizing the data in the set of data records. Examples of such information include a cardinality of one or more of the data fields in the data records, a classification of values in one or more of the data fields, relationships among data fields in individual data records, and relationships among data records. A profile of a set of data records can also include information characterizing a "pseudofield." A pseudofield is a synthesized data field that has been populated with values determined by manipulation of values taken from one or more data fields in related data records.

Based on the generated profile of the data records, the data still 31 identifies features of the data records that are relevant to the selection of a subset of data records that achieves good code coverage for the application 14. For instance, based on the profile of the data records, the data still 31 can identify one or more data fields or combinations of data fields that are likely to relate to the input variables and derived variables of the application. In some cases, subsetting rules can also be formulated based on input received from a user or from a computer storage medium and/or based on results of execution of the application 14, for example, based on input received from the result analysis module 72.

The data subsetter 18 can specify subsetting rules based on different analytical methods. In some embodiments, the data subsetter 18 specifies a subsetting rule based on an analysis of the data fields within individual data records. In one example, this includes determining which data fields are likely to relate to variables in the application 14. In another example, the data subsetter 18 identifies a target data field based on the number of allowed values of the field. For instance, a "gender" data field has only two allowed values and may be identified as a target data field. On the other hand, a "phone number" data field is not likely to be identified as a target data field.

In yet other examples, data subsetter 18 identifies, as a target data field, a pseudofield populated with data resulting from a manipulation of data in one or more data fields. For instance, data in an "income" data field can be classified into categories (e.g., high, medium, or low), and a pseudofield populated with the classifications of the "income" data field can be identified as a target data field.

In other examples, the data subsetter 18 identifies a target data field based on relationships between the target data field and one or more other data fields within the same record as indicated in the profile. For instance, the profile can indicate that the data fields "state" and "zip code" are not independent. Based on this dependence, the data subsetter 18 can consider only one of those data fields as a possible target data field.

The data subsetter 18 can also specify one or more subsetting rules based on an analysis of relationships among different data records within a set of data records and/or across different sets of data records as indicated in the profile. For instance, the profile can indicate that data records can be linked via a common value of a data field. An example of a linking value would be the value of a customer ID data field.

Once a data subsetter 18 has selected a subset of data records, and once the data-inspection unit 37 has confirmed their validity, the data engineering module 16 provides them to the computational environment manager 44, which ultimately prepares them for being operated upon by the application 14 being tested. The data engineering module 16 provides either the data records that comprise the data distillate 33 or data indicative of those data records. For instance, the data engineering module 16 can provide, to the computational environment manager 44, identifiers for data records that comprise the data distillate 33 or an address for those data records. The data engineering module 16 can also provide a file containing the selected subset of data records to the computational environment manager 44.

After execution, the result analysis module 72 generates a coverage-analysis report that contains data indicative of the outcome of having executed the application 14 on the data distillate 33. In some practices, the result analysis module 72 generates a coverage-analysis report that includes information identifying portions of the source code from which the application 14 was compiled that did or did not execute, or information identifying how many times each portion of source code from which the application 14 was compiled executed. In certain practices, the result analysis module 72 generates a coverage-analysis report that includes information identifying rules that the application 14 that did or did not execute, and information identifying a number of times the application 14 executed each rule. In other practices, the result analysis module 72 generates a coverage-analysis report that includes information identifying portions of source code from which the application 14 was compiled that did or did not execute as well as the number of times selected portions of source code from which the application 14 was compiled executed. In other practices, the result analysis module 72 generates a coverage-analysis report that includes information identifying errors that arose in connection with attempting to execute particular portions of source code from which the application 14 was compiled. In still other practices, the result analysis module 72 generates a coverage-analysis report that includes information identifying errors that arose when the application 14 attempted to execute certain rules as well as an identification of those rules that, when executed, resulted in errors.

In some practices, the result analysis module 72 generates a coverage-analysis report that directly identifies those rules that did or did not execute. In other practices, the result analysis module 72 generates a coverage-analysis report that contains additional information about the execution of the application 14, such as a number of times each logic rule was executed, a value of each variable of the application during execution, or other information.

In other practices, for each logic rule in the application that did not execute, the result analysis module 72 identifies one or more variables of the application 14 that relate to that logic rule. In some practices, the result analysis module 72 also identifies variables based on data included in the report, such as data indicative of the flow of data through the application 14, or based on preloaded information about the application. In some cases, the result analysis module 72 also identifies a value or range of values for each variable that would have caused the logic rule to execute. Once identified, the data engineering module 16 uses the input data fields and values or ranges of values that correspond to the variables to specify additional subsetting rules in subsequent selection of an updated subset of data records.

For example, if an identified variable is an input variable of the application that directly corresponds to one of the data fields of the data records, the data engineering module 16 identifies the corresponding data field and a value or range of values for the data field.

For example, if a logic rule in the application 14 executes when an input variable is greater than some threshold, the data engineering module 16 determines that any manufactured or distilled data should include at least one data record for which the input variable has a value greater than the threshold. Based on this information, the data engineering module 16 specifies an additional subsetting rule such that subsequent data records provided to the application 14 will include data sufficient to cause execution of the logic rule that only executes when the input variable to that rule is in excess of the threshold.

In another example, an identified variable does not directly correspond to one of the data fields of the data records. Such a variable is referred to as a "derived variable." In the case of a derived variable, the data engineering module 16 analyzes data-lineage to track the derivation of the derived variable through the logic of the application 14. This data-lineage analysis makes it possible to identify the particular input variable or input variables from which the identified variable is derived. The data engineering module 16 then identifies the corresponding data field or data fields and values or ranges of values for the data field.

For example, if a logic rule in the application 14 executes when the value of a derived variable is equal to a particular value, the data engineering module 16 executes instructions for data lineage analysis to determine that the derived value is derived from a logical combination of three input variables. By following the logical derivation of the derived variable, the data engineering module 16 determines required values of these three input variables to achieve a particular derived variable.

The determination of values required to yield the desired value of the derived variable is provided to the data subsetter 18, which specifies an additional subsetting rule such that the data distillate 33 includes data sufficient to cause the derived variable to attain the desired value, and to therefore trigger execution of the relevant logic rule.

In some examples, the results of the coverage analysis are also provided to the user. In response, the user may provide additional subsetting rules to the data subsetter 18 or may modify previously provided subsetting rules.

Some logic rules are so rarely triggered that even a complete set of data records is unlikely to, merely by chance, include data sufficient to cause the application 14 to execute code implementing that logic rule. To identify such deficiencies in the complete dataset, the application 14 may be executed one or more times using all of the data records as input. The resulting report identifies rules that cannot be covered regardless of the subset of data records that are selected for input. To address this deficiency, the data-driven testing framework 10 manufactures the required data using the positive-data manufacturer 22 and/or the negative-data manufacturer 24.

In some embodiments, the data engineering module 16 carries out data-subsetting by filtering. Filtering can be positive or negative. In positive filtering, one begins with an empty set and adds only those data records that satisfy some condition. In negative filtering, one begins with the full dataset and whittles it away by deleting data records that satisfy some condition.

In other embodiments, the data engineering module 16 carries out data-subsetting by identifying target data fields, determining the possible values of each such field, and selecting data records such that, for each target date field, each allowed value appears at least once, or appears a specified number of times.

In yet other embodiments, the data engineering module 16 carries out data-subsetting by data classification. This is similar to the method of identifying target data fields but with ranges of values replacing actual target values. Thus, if a target data field represents cholesterol levels to be used in risk assessment, one can define bins representing low, medium, and high incomes using ranges. In that case, the data records would be selected such that each bin, or classification, will have some predetermined number of records.

In additional embodiments, the data engineering module 16 carries out data subsetting by relying on combinations of values. This can be understood by considering two target data fields: a first field having two allowed values (e.g. gender) and a second field having twelve allowed values (e.g. birth month). If one only wanted to ensure that each possible value were present at least once, this requirement could be satisfied with only twelve records. However, it is conceivable that one may wish to have all possible combinations of these two fields. In that case, at least twenty-four records would have to be selected.

Additional details of the above methods, as well as additional methods for that can be implemented by the data subsetter 14, can be found in the patent publication entitled "DATA RECORDS SELECTION," which is already incorporated by reference.

The data engineering module 16 uses the positive-data manufacturer 22, the negative-data manufacturer 24, and the data augmenter 20 to operate according to principles set forth in the application "DATA GENERATION," which has been incorporated by reference.

The data engineering module 16 generates data of a specific type, which the user can specify. Exemplary data types include string, decimal integer, date, and time. The data engineering module 16 imposes limits on the manufactured data, such as a range of allowed values for manufactured decimal or integer data, an average string length for manufactured string data, a set of values or characters that can be used in the manufactured data, and other characteristics. A data engineering module 16 can manufacture data by modifying values in one or more fields of existing source records, augmenting source records by creating and populating new fields in the records, or creating entirely new records. In some examples, a user specifies configurable options through a user-interface.

The data engineering module 16 manufactures data for processing by the application 14 using the positive-data manufacturer 22. It can also modify or augment existing data, such as production data 26, using the data augmenter 20. For instance, the data augmenter 20 can modify values for one or more fields taken from the production data 26 or can create and populate one or more new fields and add them to existing data records in the production data 26. Using the positive-data manufacturer 22, the data engineering module 16 can also manufacture entirely new data records. In some embodiments, the format of these new records is based on the production data 26, whereas in others, an external agent, such as the user, will specify the format using the same methods discussed above in connection with specifying subsetting rules.

The data engineering module 16 manufactures data to be stored in a target. In some examples, the data engineering module 16 manufactures data based on the production data 26. In other examples, the data engineering module 16 manufactures data from scratch. As used herein, to manufacture "from scratch" means to manufacture according to specified characteristics, but not based on existing data.

The production data can be a file, a database, a parameter set, or another source of data. The production data 26 can include one or more records, each having one or more fields of data. For instance, production data 26 can be a customer database that stores customer records for customers of a retail store. Each record in such a database represents an individual customer. Each record can have multiple fields. The production data 26 can have a record format that specifies the format of the records, such as the number of fields, the type of data in each field, and characteristics of the data in each field, such as an allowed range of values, a maximum allowed value, or a list of allowed characters. In some examples, a data engineering module 16 generates data from scratch. In such cases, no data source is provided.

The data engineering module 16 manufactures data based on configuration data, which can be stored in a database, a file, or another data structure. The configuration data can specify a data-generation approach to be used, a content-generation mode, a data type of the data to be manufactured, content criteria for the data to be manufactured, and other configuration information for the data to be manufactured.

In some cases, a user specifies, through a user-interface available on the testing computer 12, some or all of the configuration data that the data engineering module 16 uses to manufacture the data. In other examples, the data engineering module 16 determines some or all of the configuration data. In these cases, the data engineering module 16 does so based on an analysis of the production data or based on information about desired properties of the target.

In some examples, the data engineering module 16 uses the data augmenter 20 to manufacture data for the target by modifying values for one or more of the fields of existing source records in the production data 26 according to the configuration data and storing the modified records in the target. In other examples, the data engineering module 16 uses the data augmenter 20 to modify all of the values for a given field. For instance, a value can be assigned to a given field for each record such that the distribution of values in the given field across all of the records matches a target distribution as indicated by the configuration data. Either the user or the configuration data specifies, or provides information for specifying, this target distribution.

In some cases, the data engineering module 16 modifies fewer than all of the values for a given field. Among these cases are those in which the data engineering module 16 only modifies values that do not meet a specified criterion as indicated by the configuration data. An example of such a case is one in which the data engineering module 16 modifies any values for a given field that fall outside of a particular range of allowed values for that field.

In some examples, the data engineering module 16 manufactures data by using the data augmenter 20 to augment existing source records of the production data 26 with one or more new fields according to the configuration data and storing these augmented records in the target. The configuration data provides instructions for determining the number of new fields, the data types and values for the new fields, and other characteristics of the new fields.

In other examples, the data engineering module 16 manufactures data by using information provided by the configuration data. The information specifies that values for a new field are to be manufactured based on the data for an existing field in the production data. Alternatively, this information specifies that values for a new field are to be manufactured according to certain characteristics that are not based on any existing source data, but that are instead specified by the configuration data.

In some examples, the data engineering module 16 manufactures data by using the data augmenter 20 to augment the existing source records of the production data 26 with one or more new records according to the configuration data and storing the augmented records (i.e., both the existing source records and the new records) in the target. In some embodiments, the new records have the same record format as the source records.

In other examples, the configuration data provides instructions for determining any combination of one or more of the following: the number of new records, the values for the fields of the new records, and other characteristics of the new records. Among these examples are those in which the configuration data specifies that values for one or more fields in the new records are to be manufactured from scratch.

In some other examples, the configuration data specifies a profile and requires that values for one or more fields in the new records be manufactured to satisfy that profile. In one such example, the profile specifies that the values for a particular field in all of the records collectively satisfy a specified characteristic. An example of a characteristic is that the values have a particular average or a particular distribution. For instance, in the customer database source, the configuration data may require that records be manufactured such that the values for the "age" field across all of the records satisfy a Poisson distribution with a particular mean.

In some examples, the configuration data requires that the data engineering module 16 apply more than one approach to data generation. For one such example, the data engineering module 16 applies any combination of the following approaches: modifying values for one or more fields, augmenting source records with one or more new fields, and augmenting the source records with one or more new records.

In some examples, the target stores only manufactured records. In other examples, a user species a source and the data engineering module 16 manufactures records based on a characteristic. Examples of suitable characteristics are the record format of the source, or a profile of one or more fields of the source.

In other examples, no source is specified. In such examples, the data engineering module 16 manufactures records automatically and from scratch according to the configuration data.

In some examples, the record format of the source is mapped to the target. In one such example, the configuration data indicates that the record format of the source is to be adopted by the target. In another such example, the configuration data requires that the record format of the source be applied to the target and that new records be manufactured from scratch by the data engineering module 16 according to the record format of the source. In other such examples, the data engineering module 16 relies on multiple sources, and the record format of each source is partially or completely mapped to the target. In at least one such example, the format of fields of interest from each source is mapped to the target.

In some examples, the data engineering module 16 maps the record format of the source to the target and modifies it. Among these examples are those in which the configuration data causes the data engineering module 16 to change the name of a field and those in which the configuration data causes removal of the field from the source.

The data engineering module 16 provides, on the testing computer 12, a user-interface that has a source window to enable a user to identify the data source. The source window includes a source-type menu that allows the user to specify a source type, such as a file or a database, and an identifier of the source, such as a path to the source or to a configuration file for a database source. In some examples, when the source is a database, the user specifies a query (e.g., a SQL query) that is to be used to obtain source data from the database. The source window provides an option to allow the user to indicate whether the data engineering module 16 is to manufacture new records, and if so, how many. The source window enables the user to view or specify other information about the source. For instance, the user can view the record format of the source, specify a file that defines the record format of the source, view the source data, or view a profile of the source data.

In some examples, the source window of the user-interface allows the user to cause the data engineering module 16 to manufacture data without specifying a source. In particular, the source window enables the user to select manufactured data as the source type in the source-type menu. Selecting manufactured data as the source type causes display of a data-generation window in the user-interface. The data generation window enables the user to indicate a method to be used to manufacture the data and to indicate a number of new records to be manufactured.

The user-interface also provides a target window that enables the user to identify the target. A target-type menu in the target window enables the user to specify the type of the target. Examples of targets include a file or database. The target window also enables the user to specify an identifier of the target (e.g., a path to a target file or a path to a configuration file for a target database). The target window provides a run button that provides the user with access to various configurable options for data generation once the source and target have been identified.

The data engineering module 16 provides several approaches to manufacture data. These include field modification, field creation, record creation, using an existing source, and using a parent dataset. To access the available approaches, a user relies on a data-generation window of the user-interface.

In the field modification approach, the data engineering module 16 modifies the values for one or more fields of the source records. In some cases, the data engineering module 16 modifies all of the values for a given field. In some examples, the data engineering module 16 modifies the values of the fields such that the distribution of values in a given field across all of the records matches a target distribution. In another example, the data engineering module 16 modifies fewer than all of the values for a given field. Among these examples are those in which the data engineering module 16 modifies only values that do not meet a specified criterion. For instance, any values that fall outside of a particular range of allowed values for a particular field can be modified.

In the field creation approach, the data engineering module 16 creates one or more new fields for existing records. In some examples, the data engineering module 16 manufactures values for a new field based on the data for an existing field in the source data. In other examples, the data engineering module 16 manufactures values for a new field from scratch.

In the record creation approach, the data engineering module 16 manufactures new records. The user specifies at least one of the number of new records and their format. For instance, if the target is to be populated with both existing source records and newly manufactured records, the record format of the new records is the same as the record format of the source records. If the target is to be populated with only newly manufactured records, the user specifies the record format to be applied to the manufactured records. The record format includes the number of fields, the type of data for each field, the characteristics of the data for each field, for example, a maximum value, a minimum value, a set of allowed characters, and other characteristics, and other features of the record format.

In the existing-dataset approach, the data engineering module 16 manufactures a specified number of new records for each key value in existing source records. A key value is a value in a field-of-interest in an existing source record.

In one example, an auxiliary source contains data to be used to populate certain fields of target records. However, the auxiliary source does not have a record format that matches the record format of either the source or the target. In this case, the data engineering module 16 maps one or more fields-of-interest from the auxiliary source to the target records. In a parent dataset approach, a source is a parent dataset in a hierarchy. In this case, the data engineering module 16 manufactures a child dataset that is related to the parent dataset. In one example of the parent-dataset approach, the parent dataset, which functions as a source, is a set of customer records; the child dataset, which functions as a target, is a set of one or more transaction records for each customer. A key field links records in the child dataset to corresponding records in the parent set. For instance, a "Customer ID" field can be a key field linking customer records and transaction records. In some cases, the data engineering module 16 receives a specification of how many child records to manufacture. In other cases, the data engineering module 16 receives a specification of a percentage of parent records that are not to be used to manufacture child records. In yet other cases, the data engineering module 16 receives a specification of a record format for the child records.

In some examples, the data engineering module 16 manufactures data according to a format specification. A format specification specifies the format of the data to be manufactured. In one example, the format specification indicates the data type of the data to be manufactured.

In other examples, the data engineering module 16 manufactures data according to a content criterion. A content criterion limits characteristics of the data to be manufactured. Examples of content criteria include an allowed range of values, a maximum allowed value, and a list of allowed characters.

In some cases, the record format of the target records specifies the format specification and the content criterion. In other examples, the user-interface provides field windows that enable the user to specify characteristics of a field, such as a format specification or a content criterion for the field.

The user-interface further includes a record-format window to enable a user to edit the target-record format. This would include editing the data characteristics for one or more fields of the target. The record-format window displays a list of the fields that are in the target-record format. This field-list also indicates the data type for each field. In some examples, fields that are in the target-record format also appear in the source-record format. Those fields that appear in both the target-record format and the source-record format are optionally marked in the field-list. In some examples, unmarked fields appear only in the target-record format. In other examples, fields that appear in the source-record format but not in the target-record format are absent from the field-list.

The record-format window enables a user to select one or more fields of the target-record format for communicating data-generation characteristics to the data engineering module 16. To assist the user in keeping track of what has been selected, the user-interface includes a selection-list of the selected fields of the target-record format. Fields listed in the selection-list are those fields of the target-record format for which the user intends to specify data-generation characteristics.

In some examples, the selection-list is a subset of a field list of all of the fields in the target-record format. This occurs if the user intends to specify data generation characteristics for only some of the fields of the target-record format.

The user-interface enables a user to edit the record format for each of the selected fields displayed in the selection-list. For instance, for each of the selected fields, the user can perform any combination of designating the data-type for the field, assigning a content generation mode to the field, and specifying data characteristics for the field. The user-interface displays one or more of a data-type window, a content-generation window, and a data-characteristics window for each of the selected fields in turn. These windows enable the user to specify various features for each of the selected fields.

The data-driven testing framework 10 described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user-interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

Having described the invention, and a preferred embodiment thereof, what is claimed as new and secured by Letters Patent is:

1. An apparatus for testing applications, said apparatus including:
a data-processing machine including a memory and a processor operably coupled to said memory, said data-processing machine having been configured to implement a data-driven testing framework that includes a data engineering module, a computational environment manager, and a result analysis module,
wherein said data engineering module is configured to create engineered test data based at least in part on an application to be tested, including
using data-lineage to track derivation of at least one derived variable through one or more transformations among at least two datasets associated with the application to be tested, where each of the at least two datasets includes a plurality of records, each record including one or more fields,
identifying at least one input variable from which said derived variable is derived, and
including in said engineered test data a first value for said input variable that corresponds to a second value for said derived variable, wherein said first value is obtained from a field of at least one of the at least two data sets,
wherein said computational environment manager is configured to control a computational environment in which said application is to operate on said engineered test data, wherein said input variable and said derived variable are accessed within said computational environment, and
wherein said result analysis module is configured to compare an output resulting from said engineered test data being operated upon by said application with an expected output.

2. The apparatus of claim 1,
wherein said data engineering module is configured to extract a subset of production data,
wherein said subset is selected to achieve a specified code coverage, and
wherein said engineered test data includes said subset of said production data.

3. The apparatus of claim 1, wherein said data engineering module includes a data still for generating distilled data from production data.

4. The apparatus of claim 3, wherein said data engineering module includes a data enhancer for receiving distilled data from said data still and enhancing said distilled data.

5. The apparatus of claim 1, wherein said data engineering module is configured to generate data based at least in part on said application to be tested, wherein said generated data is selected to achieve specified code coverage, and wherein said engineered test data includes said generated data.

6. The apparatus of claim 1, wherein said data engineering module further includes a positive-data manufacturer for generating positive data.

7. The apparatus of claim 1, wherein said data engineering module is configured to generate data based at least in part on said application to be tested, and wherein said data is absent from production data.

8. The apparatus of claim 1, wherein said data engineering module further includes a negative-data manufacturer for generating negative data.

9. The apparatus of claim 1, wherein said data engineering module includes an integrity checker for determining referential integrity between different tables of said engineered test data, wherein said engineered test data includes a plurality of tables, each table including a plurality of records, and each record including one or more fields.

10. The apparatus of claim 1, wherein said data engineering module is further configured to detect errors in referential integrity.

11. The apparatus of claim 1, wherein said data engineering module includes a re-referencer for correcting a loss of referential integrity in data prior to outputting said data as engineered test data.

12. The apparatus of claim 1, wherein said data engineering module is further configured to correct a loss of referential integrity in data.

13. The apparatus of claim 1, wherein said data engineering module includes an inspection unit for receiving said engineered test data and enabling a user to at least one of view said engineered test data and profile said engineered test data.

14. The apparatus of claim 1, wherein said data engineering module includes a data-inspection unit for receiving said engineered test data and enabling a user to view said engineered test data.

15. The apparatus of claim 1, wherein said data engineering module includes a profiler for receiving said engineered test data and enabling a user to profile said engineered test data.

16. The apparatus of claim 1, wherein said data engineering module is further configured to enable a user to profile said engineered test data.

17. The apparatus of claim 1, wherein said data engineering module is further configured to enable a user to view said engineered test data.

18. The apparatus of claim 1, wherein said data engineering module includes plural means for generating engineered test data, and wherein a particular means for generating engineered test data is generated based at least in part on information concerning said application to be tested.

19. The apparatus of claim 1, wherein said data engineering module includes a data enhancer, a data still, a negative-data manufacturer, and a positive-data manufacturer, each of which is configured to provide data that forms a basis for said engineered test data.

20. The apparatus of claim 1, wherein said data engineering module includes a logic extractor configured to identify logical functions within said application to be tested that are to be tested and provides those logical functions to a data still.

21. The apparatus of claim 1, wherein said data engineering module is further configured to identify logical functions within said application to be tested that are to be tested and provides those logical functions to be used as a basis for obtaining a subset of production data.

22. The apparatus of claim 1, wherein said computational environment manager includes means for automatically setting up and taking down a computational environment in which said application is to be tested.

23. The apparatus of claim 1, wherein said computational environment manager includes an environmental-transition machine, wherein said environmental-transition machine is configured to identify a source of said engineered test data, and wherein said environmental-transition machine is further configured to identify a target in which to place data that results from processing of said engineered test data by said application to be tested.

24. The apparatus of claim 23, wherein said environmental-transition machine is further configured to copy engineered test data from a first repository to said source.

25. The apparatus of claim 24, wherein said environmental-transition machine is further configured to copy engineered test data from said target to a second repository.

26. The apparatus of claim 1, wherein said computational environment manager includes an environmental-backup machine, and a restoration machine, wherein said environmental-backup machine is configured for backing up a first environment prior to transforming said first environment into a second environment, wherein said restoration machine is configured for replacing said second environment with said first environment, and wherein said second environment is an environment in which testing of said application to be tested is to take place.

27. The apparatus of claim 1, wherein said computational environment manager includes an executioner, wherein said executioner is configured to cause execution of said application to be tested.

28. The apparatus of claim 27, wherein said executioner is configured to automatically execute a script when causing execution of said application.

29. The apparatus of claim 1, wherein said computational environment manager includes an environmental-transition machine, an environmental-backup machine, a restoration machine, and an executioner, wherein said environmental-transition machine is configured to identify a source of said engineered test data, wherein said environmental-transition machine is further configured to identify a target in which to place data that results from processing of said engineered test data by said application to be tested, wherein said environmental-backup machine is configured for backing up a first environment prior to transforming said first environment into a second environment, wherein said restoration machine is configured for replacing said second environment with said first environment, wherein said second environment is an environment in which testing of said application to be tested is to take place, and wherein said executioner is configured to cause execution of said application to be tested.

30. The apparatus of claim 1, wherein said data engineering module is configured to extract a subset of existing data and to identify logical functions of the application to be tested, wherein said data engineering module is further configured to augment said subset of existing data, thereby generating augmented data, wherein said engineered test data includes said augmented data, and wherein said augmented data includes one or more fields added to one or more records of said subset of existing data based on the identified logical functions of the application to be tested.

31. The apparatus of claim 30, wherein said augmented data is selected to achieve specified code coverage.

32. The apparatus of claim 30, wherein said data engineering module is further configured to generate data to fill the added one or more fields based on one or more supplied rules.

33. The apparatus of claim 1, wherein said data engineering module is configured to create engineered test data by distillation of existing data, wherein said engineered test data has a higher logic concentration than said existing data.

34. A method for processing data in a computing system, said method including:
testing applications, wherein testing applications includes
receiving information representative of an application to be tested over one of an input device and a port of a data processing system, and processing said received information, wherein processing said received information includes
creating engineered test data based at least in part on said information, including
using data-lineage to track derivation of at least one derived variable through one or more transformations among at least two datasets associated with the application to be tested, where each of the at least two datasets includes a plurality of records, each record including one or more fields,
identifying at least one input variable from which said derived variable is derived, and
including in said engineered test data a first value for said input variable that corresponds to a second value for said derived variable, wherein said first value is obtained from a field of at least one of the at least two data sets,
controlling a computational environment in which said application is to operate on said engineered test data, wherein said input variable and said derived variable are accessed within said computational environment,
comparing an output resulting from said engineered test data being operated upon by said application with an expected output, and
outputting a result indicative of said comparison.

35. The method of claim 34,
wherein creating engineered test data includes extracting a subset of production data,
wherein said subset is selected to achieve a specified code coverage, and
wherein said engineered test data includes said subset of said production data.

36. The method of claim 34, wherein creating engineered test data includes determining referential integrity between different tables of said engineered test data, wherein said engineered test data includes a plurality of tables, each table including a plurality of records, and each record including one or more fields.

37. The method of claim 34, wherein creating engineered test data includes identifying logical functions within said application to be tested that are to be tested and providing those logical functions to be used as a basis for obtaining a subset of production data.

38. The method of claim 34, wherein creating engineered test data includes extracting a subset of existing data, identifying logical functions of the application to be tested, and augmenting said subset of existing data, thereby generating augmented data, wherein said engineered test data includes said augmented data, and wherein said augmented data includes one or more fields added to one or more records of said subset of existing data based on the identified logical functions of the application to be tested.

39. The method of claim 38, wherein creating engineered test data further includes generating data to fill the added one or more fields based on one or more supplied rules.

40. The method of claim 38, wherein said augmented data is selected to achieve specified code coverage.

41. The method of claim 34, wherein creating engineered test data includes creating engineered test data by distillation of existing data, wherein said engineered test data has a higher logic concentration than said existing data.

42. A computing system for testing applications, said computing system including:
   means for remembering information, and
   means for processing information, wherein said processing includes:
   receiving information over at least one of an input device and a port of a data processing system, wherein said information is representative of an application that is to be tested;
   creating engineered test data based at least in part on said application that is to be tested, including
      using data-lineage to track derivation of at least one derived variable through one or more transformations among at least two datasets associated with the application to be tested, where each of the at least two datasets includes a plurality of records, each record including one or more fields,
      identifying at least one input variable from which said derived variable is derived, and
      including in said engineered test data a first value for said input variable that corresponds to a second value for said derived variable, wherein said first value is obtained from a field of at least one of the at least two data sets;
   managing a computational environment in which said application is to operate on said engineered test data, wherein said input variable and said derived variable are accessed within said computational environment; and
   comparing an output resulting from said engineered test data being operated upon by said application and an expected output.

43. A non-transitory computer-readable medium storing software for managing testing of applications, said software including instructions for causing a computing system to execute processing steps that include:
   creating engineered test data based at least in part on an application to be tested, including
      using data-lineage to track derivation of at least one derived variable through one or more transformations among at least two datasets associated with the application to be tested, where each of the at least two datasets includes a plurality of records, each record including one or more fields,
      identifying at least one input variable from which said derived variable is derived, and
      including in said engineered test data a first value for said input variable that corresponds to a second value for said derived variable, wherein said first value is obtained from a field of at least one of the at least two data sets;
   controlling a computational environment in which said application is to operate on said engineered test data, wherein said input variable and said derived variable are accessed within said computational environment;
   comparing an output resulting from said engineered test data being operated upon by said application with an expected output; and
   outputting an analysis of said comparison.

44. The non-transitory computer-readable medium of claim 43,
   wherein creating engineered test data includes extracting a subset of production data,
   wherein said subset is selected to achieve a specified code coverage, and
   wherein said engineered test data includes said subset of said production data.

45. The non-transitory computer-readable medium of claim 43, wherein creating engineered test data includes determining referential integrity between different tables of said engineered test data, wherein said engineered test data includes a plurality of tables, each table including a plurality of records, and each record including one or more fields.

46. The non-transitory computer-readable medium of claim 43, wherein creating engineered test data includes identifying logical functions within said application to be tested that are to be tested and providing those logical functions to be used as a basis for obtaining a subset of production data.

47. The non-transitory computer-readable medium of claim 43, wherein creating engineered test data includes extracting a subset of existing data, identifying logical functions of the application to be tested, and augmenting said subset of existing data, thereby generating augmented data, wherein said engineered test data includes said augmented data, and wherein said augmented data includes one or more fields added to one or more records of said subset of existing data based on the identified logical functions of the application to be tested.

48. The non-transitory computer-readable medium of claim 47, wherein creating engineered test data further includes generating data to fill the added one or more fields based on one or more supplied rules.

49. The non-transitory computer-readable medium of claim 47, wherein said augmented data is selected to achieve specified code coverage.

50. The non-transitory computer-readable medium of claim 43, wherein creating engineered test data includes creating engineered test data by distillation of existing data, wherein said engineered test data has a higher logic concentration than said existing data.

* * * * *